(12) United States Patent
Kiani et al.

(10) Patent No.: US 9,776,183 B2
(45) Date of Patent: Oct. 3, 2017

(54) MICROFLUIDIC CARTRIDGE DEVICES AND METHODS OF USE AND ASSEMBLY

(71) Applicant: GnuBio, Inc., Cambridge, MA (US)

(72) Inventors: Sepehr Kiani, Cambridge, MA (US); Tony Hung, Cambridge, MA (US); Peter Stokes, Cambridge, MA (US); Julia Sharpe, Cambridge, MA (US)

(73) Assignee: Bio-Rad Laboratories, Inc., Hercules, CA (US)

( * ) Notice: Subject to any disclaimer, the term of this patent is extended or adjusted under 35 U.S.C. 154(b) by 0 days.

(21) Appl. No.: 15/376,366

(22) Filed: Dec. 12, 2016

(65) Prior Publication Data

US 2017/0151567 A1   Jun. 1, 2017

Related U.S. Application Data

(63) Continuation of application No. 14/502,948, filed on Sep. 30, 2014, now Pat. No. 9,555,411.

(Continued)

(51) Int. Cl.
*B01L 3/00* (2006.01)
*G01N 1/18* (2006.01)
(Continued)

(52) U.S. Cl.
CPC ..... *B01L 3/502738* (2013.01); *B01L 3/50273* (2013.01); *B01L 3/502784* (2013.01);
(Continued)

(58) Field of Classification Search
CPC ......... B01L 2200/0621; B01L 2200/10; B01L 2200/16; B01L 2300/0672;
(Continued)

(56) References Cited

U.S. PATENT DOCUMENTS 7,915,030 B2   3/2011   Inoue
8,047,829 B1   11/2011  Sommer et al.
(Continued)

FOREIGN PATENT DOCUMENTS

CN   1637407 A   7/2005
EP   2364774 A2   9/2011
(Continued)

OTHER PUBLICATIONS

International Search Report and Written Opinion mailed Dec. 2, 2013, from PCT Application No. PCT-US2013-059517 (7 pages).
(Continued)

*Primary Examiner* — Jennifer Wecker
(74) *Attorney, Agent, or Firm* — Kilpatrick Townsend and Stockton LLP; Kenneth R. Shurtz, Esq.

(57) ABSTRACT

Methods and systems for controlling fluid flow through a cartridge for use in an assay of a fluid sample for detection of a target analyte. In one aspect, the cartridge includes a microfluidic device having a network of microfluidic channels, one or more reservoirs and one or more actuatable valves for controlling fluid flow from the reservoirs through the microfluidic channels. In some embodiments, the valve includes a deformable membrane movable between a closed configuration in which the membrane seals against the microfluidic device inhibiting fluid flow and an open configuration moved away from the microfluidic device to allow fluid flow through the microfluidic channels. Other valve embodiments utilize frangible membranes or user-removable membrane.

20 Claims, 17 Drawing Sheets

Related U.S. Application Data

(60) Provisional application No. 61/884,432, filed on Sep. 30, 2013.

(51) Int. Cl.
*C12M 1/34* (2006.01)
*F16K 99/00* (2006.01)

(52) U.S. Cl.
CPC ...... *F16K 99/0015* (2013.01); *F16K 99/0059* (2013.01); *B01L 2200/025* (2013.01); *B01L 2200/0621* (2013.01); *B01L 2200/10* (2013.01); *B01L 2200/16* (2013.01); *B01L 2300/021* (2013.01); *B01L 2300/0654* (2013.01); *B01L 2300/0672* (2013.01); *B01L 2300/087* (2013.01); *B01L 2300/0867* (2013.01); *B01L 2300/0887* (2013.01); *B01L 2400/0487* (2013.01); *B01L 2400/0638* (2013.01); *B01L 2400/0655* (2013.01); *B01L 2400/0683* (2013.01)

(58) Field of Classification Search
CPC ....... B01L 2300/0867; B01L 2300/087; B01L 2300/0887; B01L 2400/0487; B01L 2400/0638; B01L 2400/0655; B01L 2400/0683; B01L 3/50; B01L 2300/0654; B01L 2300/021; B01L 2200/025; F16K 99/0015; F16K 99/0059
See application file for complete search history.

(56) References Cited

U.S. PATENT DOCUMENTS

| | | | |
|---|---|---|---|
| 8,372,355 | B2 | 2/2013 | Zhou |
| 8,492,157 | B2 | 7/2013 | Park |
| 8,528,589 | B2 | 9/2013 | Miller et al. |
| 8,535,889 | B2 | 9/2013 | Larson et al. |
| 8,778,282 | B2 | 7/2014 | Jung et al. |
| 2003/0064507 | A1 | 4/2003 | Gallagher |
| 2004/0089548 | A1 | 5/2004 | Mehta et al. |
| 2004/0189311 | A1* | 9/2004 | Glezer ............... B01L 3/5027 324/444 |
| 2008/0014589 | A1 | 1/2008 | Link et al. |
| 2010/0179069 | A1 | 7/2010 | Huang |
| 2010/0209304 | A1 | 8/2010 | Sarofim |
| 2010/0285975 | A1 | 11/2010 | Mathies et al. |
| 2010/0303687 | A1 | 12/2010 | Blaga |
| 2011/0000560 | A1 | 1/2011 | Miller et al. |
| 2011/0053151 | A1 | 3/2011 | Hansen et al. |
| 2011/0054397 | A1 | 3/2011 | Menot et al. |
| 2011/0151578 | A1 | 6/2011 | Abate et al. |
| 2011/0201099 | A1* | 8/2011 | Anderson ............... G01N 21/05 435/287.2 |
| 2011/0218123 | A1 | 9/2011 | Weitz et al. |
| 2011/0250597 | A1 | 10/2011 | Larson et al. |
| 2011/0267457 | A1 | 11/2011 | Weitz et al. |
| 2012/0015822 | A1 | 1/2012 | Weitz et al. |
| 2012/0091004 | A1 | 4/2012 | Abell et al. |
| 2012/0132288 | A1 | 5/2012 | Weitz et al. |
| 2012/0219947 | A1 | 8/2012 | Yurkovetsky et al. |
| 2012/0220494 | A1 | 8/2012 | Samuels et al. |
| 2012/0222748 | A1 | 9/2012 | Weitz et al. |
| 2012/0309002 | A1 | 12/2012 | Link |
| 2013/0344485 | A1 | 12/2013 | Raz et al. |
| 2014/0198313 | A1 | 7/2014 | Tracy et al. |
| 2014/0354795 | A1 | 12/2014 | Tracy et al. |
| 2014/0370499 | A1 | 12/2014 | Hoang |
| 2015/0024945 | A1 | 1/2015 | Healy |
| 2015/0045258 | A1 | 2/2015 | Raze et al. |
| 2015/0065396 | A1 | 3/2015 | Kiani et al. |
| 2015/0093815 | A1 | 4/2015 | Kiani et al. |
| 2015/0094232 | A1 | 4/2015 | Abate et al. |
| 2015/0209785 | A1 | 7/2015 | Esmail et al. |
| 2015/0321163 | A1 | 11/2015 | Hung et al. |
| 2015/0375229 | A1 | 12/2015 | Possinger et al. |
| 2016/0001289 | A1 | 1/2016 | Hung et al. |

FOREIGN PATENT DOCUMENTS

| | | |
|---|---|---|
| EP | 2662135 A2 | 11/2013 |
| WO | 2007-081385 A2 | 7/2007 |
| WO | 2007-081387 A1 | 7/2007 |
| WO | 2012-078710 A1 | 6/2012 |
| WO | 2012-135201 A1 | 10/2012 |
| WO | 2012-135259 A1 | 10/2012 |
| WO | 2012-135327 A1 | 10/2012 |
| WO | 2013-095737 A2 | 6/2013 |
| WO | 2013-122826 A1 | 8/2013 |
| WO | 2013-165748 A1 | 11/2013 |
| WO | 2014-043388 A1 | 3/2014 |
| WO | 2014-093976 A1 | 6/2014 |
| WO | 2014-117088 A1 | 7/2014 |
| WO | 2014-176599 A1 | 10/2014 |

OTHER PUBLICATIONS

International Search Report and Written Opinion mailed Jan. 2, 2015, from PCT Application No. PCT/US2014/058445 (12 pages).

Cristobal et al. Microfluid bypass for efficient passive regulation of droplet traffic at a junction. Applied Physics Letters. 89:034104. 2006. [retrieved on Jan. 7, 2015]. Retrieved from the Internet. <URL: http://lof.cnrs.fr/IMG/pd/Microfluidic_bypass_for_efficient_passive_regulation_of_dropplet_traffi c_at_ajunction.pdf>.

Zheng et al. Formation of Droplets of Alternating Composition in Microfluidic Channels and Applicantions to Indexing of Concentrations in Droplet-Based Assays. Analytical Chemistry. 6(17):4977-4982. 2004. [retrieved on Jan. 6, 2015]. Retrieved from the Internet. <URL: http://www.ncbi.nlm.nih.gov/pmc/articles/PMC1766978/>.

* cited by examiner

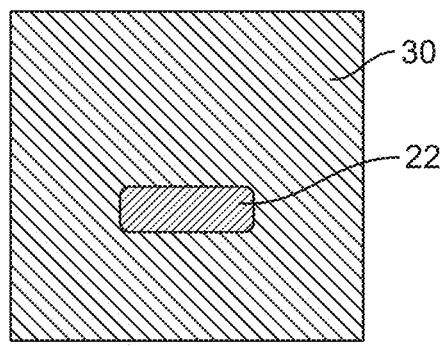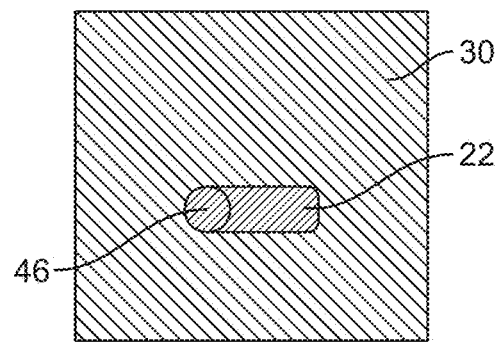
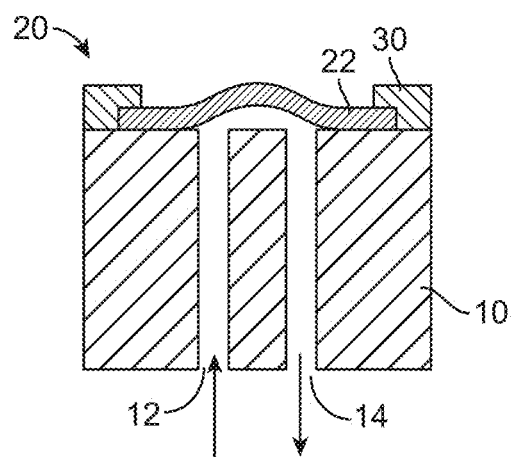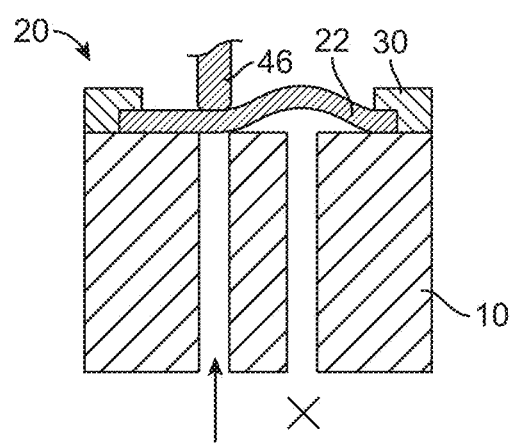
FIG. 12A  FIG. 12B

MICROFLUIDIC CARTRIDGE DEVICES AND METHODS OF USE AND ASSEMBLY

CROSS-REFERENCES TO RELATED APPLICATIONS

The present application is a continuation of U.S. patent application Ser. No. 14/502,948, filed Sep. 30, 2014, entitled "Microfluidic Cartridge Devices and Methods of Use and Assembly," which application claims benefit of priority to U.S. Provisional Patent Application No. 61/884,432, filed Sep. 30, 2013, the entire contents of each of which are incorporated herein by reference.

The present application is related to PCT Application No. US2013/059517, filed Sep. 12, 2013; and U.S. Non-Provisional Application 14/470,860, filed Aug. 27, 2014, each of which is incorporated by reference in its entirety.

BACKGROUND OF THE INVENTION

Microfluidic devices require a source of liquid reagents to operate. Typically for emulsion-based systems, these reagents are stored in bottles or tubes which are then connected to the device by the user, with tubing and connectors. This requires complex manipulation of tubing and connectors, creating the potential for waste, due to leaks or operator errors. Reagent leaks and handling contamination are a considerable source of variability in system operation.

By their very nature, microfluidic devices deal in the behavior, precise control, and manipulation of fluids that are geometrically constrained to small scales. To drive fluids across micro-scale features within devices, power must be supplied to move the working fluid(s). Devices can feature micropumps or small-scale external pressure sources, some even harness capillary forces or electrokinetic mechanisms. One approach to generating fluidic motion is the use of servo-driven syringe pumps. These pumps have high fluidic capacitances and often require cumbersome fluidic pre-preparation. The process can result in long settling times and unsteady fluidic transients.

Where using channels of micron scale, there is the ability to manufacture devices that have excellent control over the production, handling, manipulation, merging, and detection of droplets with volumes on the order of picoliters at rates exceeding 100,000 times per second. The source of fluid to be used in a microfluidic device is typically located separately from the device, such as in a syringe, where the fluid is subsequently introduced into the microfluidic device via tubing or another via another source. When a microfluidic device has many fluid inputs and outputs connecting to any syringes with many ports for tubing, the complexity of the device increases along with the cost of fabrication, assembly and operation.

BRIEF SUMMARY OF THE INVENTION

In one aspect, a cartridge is provided for a microfluidic system, where the reagents are stored, integrated within the cartridge in sealed reservoirs so as not to flow into the microfluidic device until dictated by operation. This allows for long term storage of cartridges containing reagents, while protecting the reagents and microfluidic device from contamination and degradation. In operation, the cartridge reduces reagent volumes required, by keeping the microfluidic device in close proximity to its reagent source and waste reservoirs. In one aspect, a mechanism is provided for controlling the flow within microfluidic channels of a microfluidic cartridge device. The mechanism may be a valve integrated directly onto the microfluidic device of the cartridge. An advantage of the devices described herein includes a valve in a microfluidic system having simple construction geometry, allowing cost-effective manufacture of valve features and components. Another advantage is a very small volume, appropriate to the smaller volumes of fluid being employed in microfluidic devices, as compared to any non-integrated off-device valve.

In some embodiments, a system is provided for controlling and regulating the pressure and flow associated within a microfluidic cartridge device by use of a valve having a deformable membrane. This deformable membrane approach is used to drive the flow of fluids within microfluidic devices using hydrostatic pressure. The approach at both sealing reagent volumes and driving them by way of a deformable membrane that is used to drive fluidic transport is claimed as novel.

In some embodiments, the invention relates to a microfluidic device cartridge having user fill ports for filling reservoirs or microfluidic channels of the device as desired. In one aspect, methods of the invention relate to filling of specific volumes of a microfluidic device, including whatever connected assemblage of channels and reservoirs as the designer may desire, with fluid using one, or in some case, two or more, filling port(s). In one aspect, such methods leave substantially no residual air in the volume after the fluids have been introduced, which is advantageous, for instance, in cases where reagents are sensitive to being stored in the presence of air, or where reagents are emulsions that are damaged when subjected to typical shipping stresses in the presence of air, or where the dispensing method for the fluid in the diagnostic end-use system requires that no air be in the microfluidic device.

In one aspect, a microfluidic cartridge assembly is provided for performing an assay of a target analyte in a biological sample. In some embodiments, the microfluidic cartridge includes a cartridge housing defining one or more reservoirs, the one or more reservoirs including a reagent reservoir containing a reagent; a microfluidic substrate attached to the cartridge housing, the microfluidic substrate having a plurality of microfluidic channels in fluid communication with the one or more reservoirs, the plurality of microfluidic channels being adapted for performing an assay of the target analyte in the sample using the reagent; one or more valves in fluid communication with the plurality of microfluidic channels that are actuatable between a closed configuration that inhibits fluid flow through the microfluidic channels and an open configuration allowing fluid flow from the one or more reservoirs through the plurality of microfluidic channels; and one or more pressure septa in fluid communication with the plurality of microfluidic channels adapted for introducing pressure into the plurality of microfluidic channels to facilitate fluid flow through the plurality of microfluidic channels in a controlled manner so as to perform the assay of the target analyte in the sample during fluid flow through the plurality of microfluidic channels when the one or more valves are in the open configuration. The one or more valves may include a first valve positioned such that, when in the closed configuration, the first valve isolates the reagent in the reagent reservoir from the plurality of microfluidic channels and, when in the open configuration, the first valve allows flow of the reagent through the microfluidic channels. In some embodiments, the one or more reservoirs further include a waste reservoir fluidly coupled with the plurality of microfluidic channels such that fluid flow through the plurality of microfluidic channels during the assay terminates in the waste reservoir.

In some embodiments, the cartridge housing includes a first plate attached to a first side of a cartridge body, the microfluidic substrate being attached to a second side of the cartridge body opposite the first side, the first plate being adapted to seal at least one of the one or more reservoirs or the plurality of microfluidic channels, wherein the first plate includes one or more fill ports for filling of at least one of the one or more reservoirs and the one or more pressure septa for introducing pressure into the plurality of microfluidic channels. In some embodiments, the one or more reservoirs includes a sample reservoir and the one or more fill ports includes a user fill port in fluid communication with the sample reservoir and/or the reagent reservoir. The user fill port may include a septum so as to allow filling through the fill port while maintaining a seal of the respective reservoir. In one aspect, the one or more reservoirs include a first reagent reservoir that is sealed and open to the plurality of microfluidic channels only through a valve of the one or more valves, the first reagent reservoir having one or more reagents sealed within. The one or more reservoirs may further include a second reagent reservoir fluidly coupled with the plurality of microfluidic channels through a second valve of the one or more valves and a reagent fill port of the one or more fill ports in the first plate. In one aspect, the one or more pressure septa comprise a membrane confined between the first plate and the cartridge body such that penetration of the septa with a pressurization needle allows pressurization through the needle while maintaining a seal within the plurality of microfluidic channels. The pressure septa may include a polymer membrane adapted so as to maintain a seal after penetration with the pressurization needle to at least a minimum pressure, such as 20 psi or more.

In one aspect, the one or more valves are adapted to alternate from the closed configuration to the open configuration upon movement of a movable membrane of the valve. The movable membrane may be positioned between a cartridge body and the microfluidic substrate such that deflection of the movable membrane opens the valve to allow flow of a fluid from one microfluidic channel to another microfluidic channel abutting the deformable membrane. The one or more valves are may be adapted to alternate from the closed configuration to the open configuration upon the cartridge being pressurized or put under vacuum to a pre-determined pressure applied through the one or more septa.

In some embodiments, the cartridge includes a valve sealing device adapted to maintain the one or more valves in the closed configuration. The valve closing device is removably attachable to the cartridge assembly such that when attached to the cartridge assembly, the valve closing device maintains the one or more valves in the closed configuration and when removed from the cartridge assembly, the valves are actuatable to the open configuration upon pressurization of the cartridge. Each of the one or more valves may include a movable membrane that fluidly seals a microfluidic channel of the plurality at which the respective valve is located. The movable membrane may be confined between the microfluidic substrate and a cartridge body attached to the substrate, each membrane being accessible through an actuation aperture in the cartridge body to facilitate closing and opening of the valve. In some embodiments, each valve of the plurality may include a ring of adhesive disposed between the cartridge body and the movable membrane circumscribing the actuation aperture so as to maintain a seal of the plurality of microfluidic channels when the valve is in the open configuration. In some embodiments, the movable membrane is coupled between the cartridge body and the microfluidic channel with an epoxy.

In embodiments having a plurality of valve with movable membranes, the valve closing member or device may be configured as a multi-pronged device having a plurality of prongs corresponding to the plurality of valves, each of the prongs extending from an arm of the device configured as a beam that sets a force at which the respective prong presses against the valve when the device is attached to the cartridge assembly.

In certain embodiments, the microfluidic cartridge may include one or more valves configured with a frangible membrane frangible such that actuation of the valve comprises breaking the frangible membrane with an actuator device so as to alternate the respective valve to the open configuration. Alternatively, the cartridge may include a valve comprising a layer, such as a polymer or foil layer, that that inhibits actuation of the valve such that penetrating or removing the layer allows actuation of the valve to an open configuration. In some embodiments, the cartridge may include multiple valves of any of the valves configurations described herein including various combinations thereof.

In some embodiments, the microfluidic cartridge has one or more reservoirs that include at least two reagent reservoirs and the microfluidic channels include at least two microfluidic channels linked to the at least two reagent reservoirs that form a junction with a joint microfluidic channel such that when the one or more valves are opened and the plurality of microfluidic channels are pressurized, flow in the joint microfluidic channel alternates between the two or more previously formed, differentially labeled population of droplets, wherein the plurality of microfluidic channels are configured to allow droplets to flow from the two or more inlets through the microfluidic channels toward the joint microfluidic channel in an alternating fashion. The cartridge may further include a connection channel, in fluid communication with and between the two microfluidic channels, said connection channel configured to allow a continuous phase fluid but not the droplets to flow between the microfluidic channels. The cartridge assembly may be adapted such that fluid flows through the plurality of microfluidic channels and the one or more valves from the one or more reservoirs to a waste reservoir without passage through a sample preparation chamber or amplification chamber.

In some embodiments, the cartridge includes one or more optically transparent or translucent portions so as to allow optical detection of movement of droplets of fluid flowing through the microfluidic channels and/or to allow optical detection of an indicator of the target analyte through the translucent portion during movement of droplets of fluid flowing through the microfluidic channels.

In some embodiments, the microfluidic cartridge includes a cartridge body defining one or more cavities; a first plate bonded to one side of the cartridge body; a microfluidic substrate having a plurality of microfluidic channels formed therein, the plurality of microfluidic channels being arranged in a network suitable for performing an assay, wherein the microfluidic substrate is bonded to an opposite side of the cartridge body such that the one or more cavities are sealed between the first plate and the microfluidic substrate forming one or more reservoirs in fluid communication with the microfluidic channels of the microfluidic substrate; one or more valves disposed along a flow path between the one or more reservoirs and at least a portion of the microfluidic channels and adapted to control fluid flow therebetween; and at least two pressure ports in fluid communication with the plurality of microfluidic channels and/or reservoirs such that a pressure differential between the at least two pressure ports facilitates fluid flow through the plurality of microfluidic channels sufficient to perform the assay of the target analyte in the sample when input into the cartridge.

DEFINITIONS

A "sample(s)", "one or more samples", or "sample(s) of interest" are terms used interchangeably in singular or plural form and are not intended to be limited to any particular quantity and, as used herein, may be any molecule or substance that the user wishes to gather information from. A sample may become larger or smaller (e.g., by way of inflation or partitioning, respectively) in size, volume or content during the performance of an assay. Accordingly, a sample may be amplified and/or subdivided one or more times during the performance of an assay. In some embodiments, the sample comprises nucleic acids.

A "fluid", as used herein, is any aqueous or lipophilic phase capable of flowing freely. Two or more fluids may flow in a manner referred to as "co-flowed" such that the flow of each fluid is laminar in the same direction within the range or timescale of the operation of the system but such that they are not substantially mixing. The fluid and/or emulsion injected into or out of a droplet may further comprise one or more reagents, reaction components or samples of interest selected from cells (including any eukaryotic or prokaryotic cells, including but not limited to cells selected from humans, animals, plants, fungi, bacteria, viruses, protozoa, yeasts, molds, algae, rickettsia, and prions); proteins, peptides, nucleic acid sequences, oligonucleotide probes, polymerase enzymes, buffers, dNTPs, organic and inorganic chemicals, and fluorescent dyes.

An "emulsion", as used herein, is a stable mixture of at least two immiscible or partially immiscible liquids. In general, immiscible liquids tend to separate into two distinct phases. Accordingly, a surfactant may be added to stabilize the emulsion by reducing surface tension between the at least two immiscible or partially immiscible liquids and/or to stabilize the interface. For example, an emulsion according to the systems, methods and kits of this invention may comprise a plurality of aqueous drops in an immiscible oil, such as fluorocarbon oil, silicon oil or hydrocarbon oil (including, but not limited to, petroleum and mineral oil) where the drop size ranges from about 0.5 to about 5000 microns in diameter. Unless stated otherwise, the term "fluid" encompasses an emulsion.

BRIEF DESCRIPTION OF THE DRAWINGS

FIGS. 12A-12B illustrate alternative example valves for use in the microfluidic channels of a reagent cartridge in accordance with some embodiments.

DETAILED DESCRIPTION OF THE INVENTION

Figure 1:
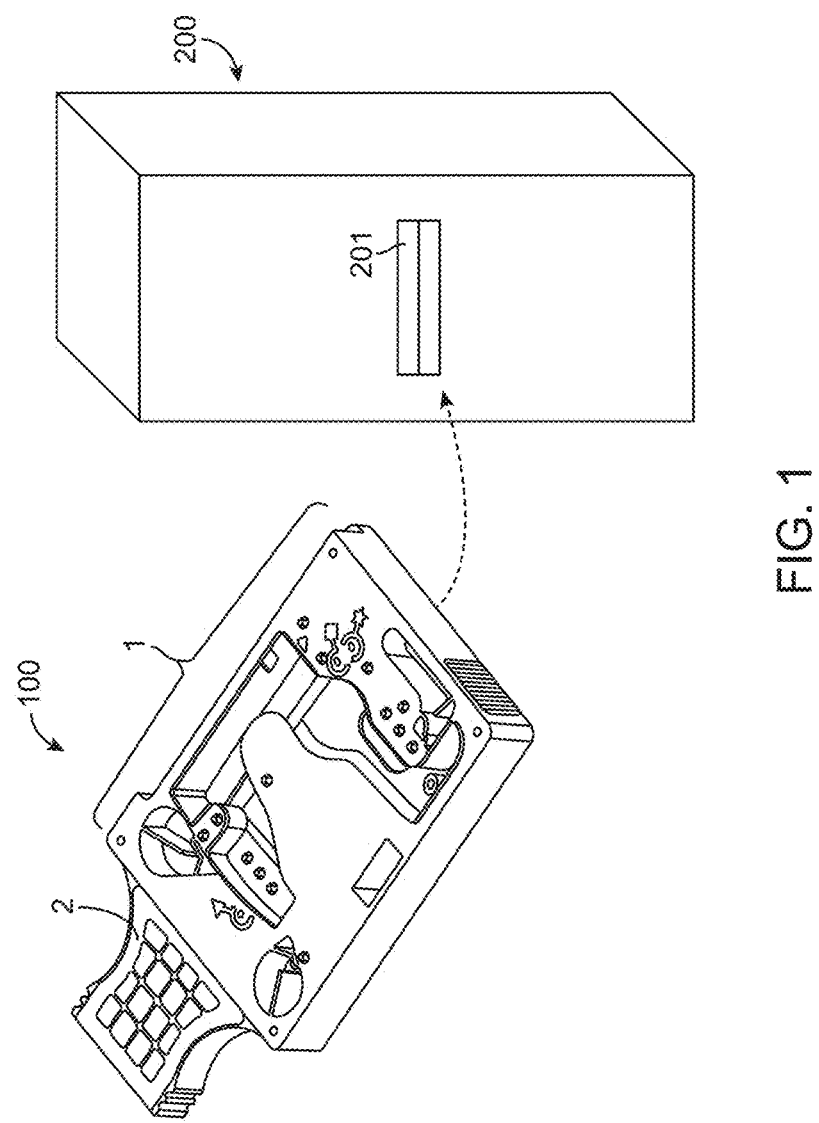
FIG. 1 shows an overview of a system for performing an assay of a target analyte that includes a reagent cartridge in accordance with some embodiments of the invention.

A variety of aspects for use in microfluidic cartridge systems are provided herein, including but not limited to methods and structures for controlling fluid flow of reagents stored within a microfluidic cartridge for performing an assay for detection of a target analyte in a fluid sample. The methods, devices and systems described herein can be used in isolation or adapted to any number of different microfluidic system configurations. One such system is depicted in FIG. 1. It should be recognized that the system of FIG. 1 is not intended to limit the invention. For example, aspects of the system of FIG. 1 can be used in separation from other aspects of the system while using the inventive configurations described herein.

In one or more embodiments, the system comprises a microfluidic cartridge having a microfluidic device with a network of microfluidic channels adapted for performing an assay and one or more reservoirs for containing a reagent for use in the assay. In one aspect, the cartridge includes one or more actuatable valves that isolate the reagent stored within the one or more reservoir until required within the assay process. The cartridge includes one or more user fill ports for injecting a fluid sample and any enzymes needed into the network of microfluidic channels through one or more inlets. The injection inlet and microfluidic channels may have an average critical dimension of less than about 100 µm, less than about 10 µm, less than about 1 µm, less than about 100 nm, less than about 10 nm, and so forth. The microfluidic channels of the microfluidic device are designed so that the reagents and fluid samples flowing therethrough form a series of droplets of fluid and/or emulsion that are processed within the cartridge according as desired for a particular assay.

Such processing may include steps of preparation of the fluid sample by mixing with one or more enzymes, mixing with a reagent or various other fluids, separation and amplification, each of which is performed as the droplets flow within the microfluidic channels. These processes are performed by precisely controlling flow of the droplets from the inlet and the one or more reservoirs so as to control specific volumes, flow rates, timing and temperature as well as to inject various components into each droplet as needed to perform the assay. Precise control over the flow through the channels is desirable as the volume injected into or out of each drop may be less than about 10 μL, less than about 1 μL, less than about 100 nL, less than about 10 nL, less than about 1 nL and so forth. Additional aspects of performing an assay using droplets flowing within a network of microfluidic channels is described further in U.S. application Ser. No. 14/470,860, U.S. Patent Application Publication No. 2012/0132288 and PCT Publication No. WO 2012/135259.

Exemplary system components for use in such systems are described in, e.g., US2011/0267457, US2011/0151578, US2011/0218123, US2012/0222748, US2011/0218123, 2012/0222748, WO2012/135201, WO2012/135259, WO2014/043388, WO 2012/135327.

The direction and rate of volume may be controlled by controlling various factors of the drops, fluids, emulsions, and/or system components, including but not limited to, the mechanism of disrupting the interface between the drop and the fluid and/or emulsion (discussed further below); the curvature and/or velocity of the drop; the pressure in the injection channel and/or the microfluidic channel relative to one another; the surface tension of the drop; the surface tension of the fluid and/or emulsion; the geometry of the injection inlet, and so forth as will be known and appreciated by one of skill in the art. The above factors may, in some instances, result in forces acting on the system, as described below.

In one embodiment, the cartridge device is integrated with a microfluidic device. A "microfluidic device", as used herein, is a device that provides a deterministic function on liquid or gas fluids at small scales typically measured in volumes such as, for example, milliliter (mL), microliter (μL), nanoliter (nL), picoliter (pL), or femtoliter (fL) volumes and/or by physical scale such as millimeter (mm), micrometer (pm) (also referred to as "micron"), nanometer (nm), and so forth. Functions may include mixing, splitting, sorting, heating, and so forth. Microfluidic devices may comprise microfluidic channels as a means for transferring fluids or samples from one point to another and are typically of uniform cross section in the mm, pm or nm scale. Such devices are typically formed in one or more substrates, the channels being formed by an etching process, such as in a photo-lithography process.

A wide variety of methods and materials exists and will be known and appreciated by one of skill in the art for construction of microfluidic channels and networks thereof, such as those described, for example, in U.S. Pat. No. 8,047,829 and U.S. Patent Application Publication No. 20080014589, each of which is incorporated herein by reference in its entirety. For example, the microfluidic channel may be constructed using simple tubing, but may further involve sealing the surface of one slab comprising open channels to a second flat slab. Materials into which microfluidic channels may be formed include silicon, glass, silicones such as polydimethylsiloxane (PDMS), and plastics such as poly(methyl-methacrylate) (known as PMMA or "acrylic"), cyclic olefin polymer (COP), and cyclic olefin copolymer (COC). The same materials can also be used for the second sealing slab. Compatible combinations of materials for the two slabs depend on the method employed to seal them together. The microfluidic channel may be encased as necessary in an optically clear material to allow for optical excitation (resulting in, e.g., fluorescence) or illumination (resulting in, e.g., selective absorption) of a sample as necessary, and to allow for optical detection of spectroscopic properties of light from a sample, as the sample is flowing through the microfluidic channel. Preferred examples of such optically clear materials that exhibit high optical clarity and low autofluorescence include, but are not limited to, borosilicate glass (e.g., SCHOTT BOROFLOAT® glass (Schott North America, Elmsford N.Y.)) and cyclo-olefin polymers (COP) (e.g., ZEONOR® (Zeon Chemicals LP, Louisville Ky.)).

Microfluidic processes occur within flow networks of very fine channels constructed with various specialized functions. Typically, the flow network for a microfluidic process is implemented by forming open channels on a substantially planar plate of material which is then sealed to another flat surface, enclosing the channels. This assembly is referred to as a "microfluidic device." Typical microfluidic systems connect fluid source and drain reservoirs to the microfluidic device with discrete tubes and connectors. The reservoirs and the source of motive power, driving the fluid into the system, are separate from the microfluidic device itself. The context for the embodiments described here is the field of biological analysis, more specifically systems for DNA sequencing. However, it will be seen that the teaching herein has application to microfluidic systems, particularly those employing expensive, perishable, or hazardous reagents. Emulsion-based microfluidic systems, in particular, are often supplied with certain reagents which are already in an emulsified form. In these cases, the proximity of the storage to the microfluidic device, the strong environmental sealing, and high degree of control over the entire fluid path are of particular benefit to the design of robust systems.

FIG. 1 illustrates an overview of a system for performing an assay for a target analyte in a sample using a reagent cartridge 100 and a cartridge interface device 200. The reagent cartridge include an operable portion 1 that is insertable into a receptacle 210 of the cartridge interface device 200 for interfacing with various components to facilitate performance of the assay in operable portion 110. The cartridge may be held by a proximal handle 2 when inserted into the cartridge interface device 200. In some embodiments, the cartridge includes a microfluidic device (e.g., microfluidic substrate) having multiple microfluidic channels and one or more reservoirs in fluid communication with the microfluidic channels through one or more actuatable valves. In one aspect, the one or more reservoirs contain reagent for use in performing an assay of a sample input into the cartridge for a target analyte. An example of such a cartridge is shown in more detail in FIGS. 2A-2B.

In one aspect, the cartridge is designed as a one-time use disposable cartridge for performing an assay for a target analyte of a single analyte within the cartridge interface device, typically within a few hours or less. The cartridge defines a network of microfluidic channels in fluid communication with one or more reservoirs so that controlled fluid flow through the microfluidic channels performs an assay for a target analyte in a fluid sample input into the cartridge. Such a cartridge may include one or more pressure ports through which pressure is controlled so as to facilitate controlled fluid flow through the network of microfluidic channels.

In some embodiments, the cartridge is provided to a user with one or more reservoirs pre-filled with one or more reagents suitable for a particular assay. A reservoir may be pre-filled with a reagent or may be configured to allow the user to fill the reservoir with a reagent at run time.

Figure 2A:
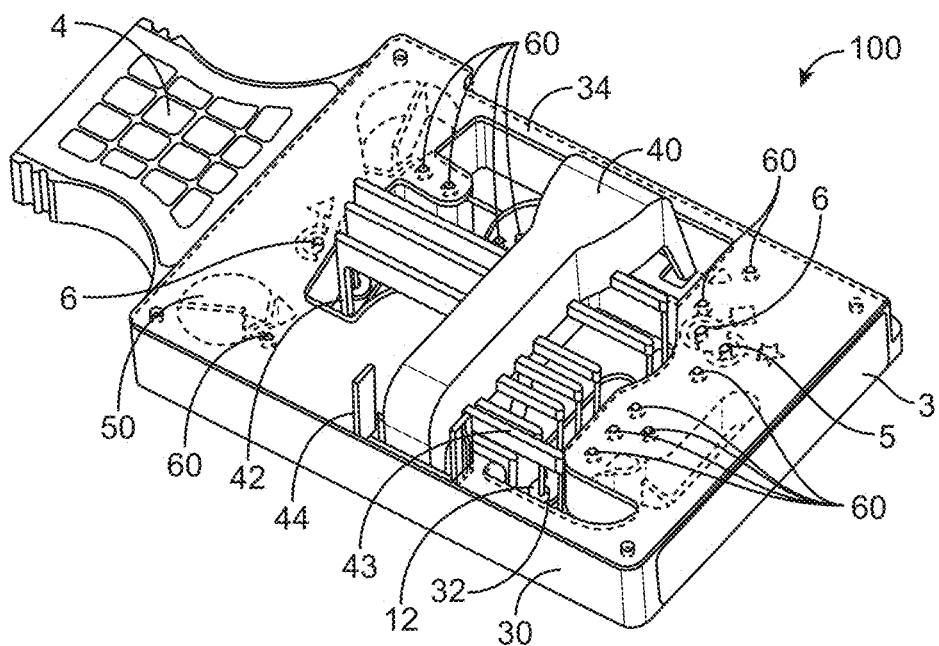
FIGS. 2A-2B illustrate view of a top and underside of an example reagent cartridge in accordance with some embodiments.

FIG. 2A illustrates a view from a first side of the cartridge device 100 while FIG. 2A illustrates a view from the opposite side or underside of the device. As described above, the cartridge 100 includes a microfluidic device 10, which in this embodiment is a substrate in which microfluidic channels are formed, such as by etching a substrate. The microfluidic device 10 is attached to an underside of the cartridge housing defining one or more reservoirs in fluid communication with the microfluidic channels. In this embodiment, the cartridge housing is defined by a cartridge body 30 and a top plate 34 attached to the side of the cartridge body opposite the side attached to the microfluidic device 10. In one aspect, the cartridge body comprises multiple features that are bonded onto the top plate, as can be understood further by referring to FIGS. 14A-16F. The cartridge body defines, at least in part, multiple reservoirs 50 in which a fluid can be contained for use in performing the assay, for example any of a reagent, enzyme or sample. The reservoirs may be a defined cavity in either the top side or underside of the cartridge body, such that the top plate 34 or the microfluidic substrate 10 seals the reservoir, or the cavity may extend entirely through the cartridge body such that the reservoir is sealed by attachment of both the top plate 34 and the microfluidic substrate 10. The cartridge body and plate may be fabricated from any suitable material compatible with any fluids that may the body and plate may come into contact with, for example the reagents and enzymes. The cartridge body can be constructed from a polymer-based material, glass, and the like or from differing materials that are bonded together. The cartridge body may be formed with one or more ribs 31, such as those shown on the underside of the cartridge body 30 in FIG. 2B. The one or more ribs facilitate attached to the microfluidic device 10 by providing additional surfaces for bonding to the microfluidic device 10 as discussed further below.

In one aspect, the cartridge housing includes one or more fill ports in fluid communication with the microfluidic channels and/or a reservoir of the cartridge device so as to allow a user to input a fluid sample or one or more enzymes into the cartridge device, or in some embodiments, to fill a reservoir with a perishable reagent. In the embodiment in FIGS. 2A-2B, the top plate is configured with a user fill port 5 in fluid communication with the microfluidic channels by which a user can input the fluid sample, for example by pipetting the fluid sample into the device. The top plate 34 may also include one or more user fill ports 6 for inputting an enzyme into the cartridge for mixing with the fluid sample during the assay process, although it will be appreciated that the fill ports may be located at various other locations in the cartridge housing. The user fill ports may be open or include a septa through which the sample or enzyme can be injected into the microfluidic device, such as through a pipette or needle, so as to maintain a desired pressure within the chamber in which the sample or enzyme is injected.

Each cartridge includes a product label 4, such as that show in the handle 2 of the cartridge in FIG. 2A. The product label may list the assay for which the cartridge is configured to perform, product and manufacturer data or other product information. Each cartridge may also include a unique machine readable identifier, such as a barcode 4, positioned so that a reader in the cartridge interface 200 can read the barcode when the cartridge is received within the interface so that any results can be associated with a sample being tested or so that the interface device can automatically perform a particular sequence of pressurization and optical detection of fluid flow and optical target detection based on reading of the barcode.

Figure 2B:
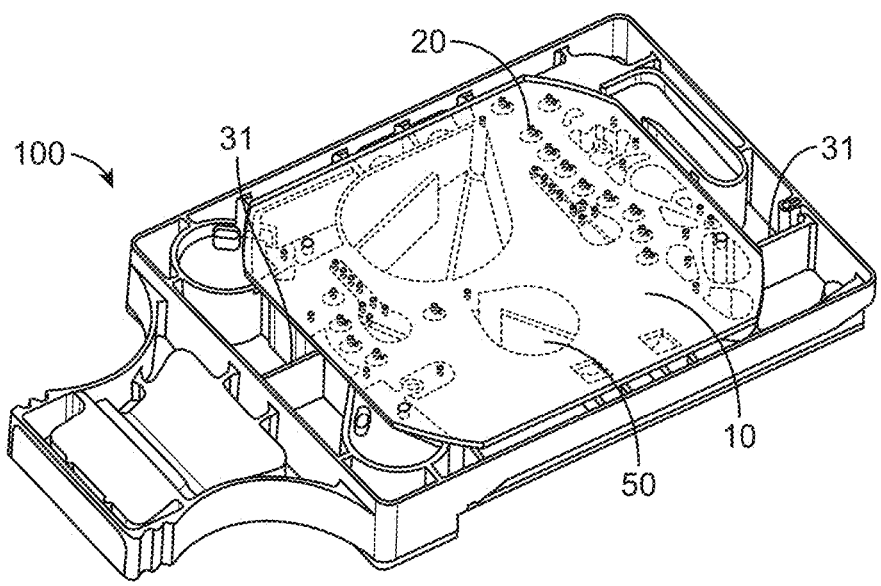

In another aspect, the cartridge device include one or more actuatable valves that isolate a fluid stored in a reservoir of the cartridge from the microfluidic channels (or otherwise isolate fluid disposed in a first portion of the microfluidic channels from a second portion of the microfluidic channels). The one or more valves are configured to be in fluid communication with the microfluidic channels of the cartridge and adapted to control fluid flow through various portions of the microfluidic device, such as by regulating a fluid flow therethrough in regard to fluid displacement or pressure. As shown in FIGS. 2A-2B, the cartridge may include multiple valves at an interface between the microfluidic device and the cartridge body such that actuation of a respective valve of the plurality alternates the valve between a close configuration inhibiting fluid flow through the valve and an open configuration that facilitates fluid flow through the valve.

In some embodiments, each reservoir includes an associated valve that isolates fluid contained with the reservoir from the microfluidic channels until the fluid is required for use in the assay. One or more of the user fill ports may also be associated with one or more valves so as to isolate a fluid input through the fill port until such time as flow is desired. Flow of the fluids input through the fill ports and/or from the reservoir into the microfluidic channels may be effected by introduction of a motive force. This motive force may be supplied by any number of mechanisms, including mechanisms that change a volume to facilitate fluid flow, such as by movement of a membrane, wall or piston, or mechanisms that introduce pressure, such as pressurization needle that increases or decreases pressure by introducing a fluid, including air.

Fluid flow through the microfluidic channels can be controlled by controlling pressure within the microfluidic channels by use of one or more pressure ports. Typically, the one or more (e.g., 2, 3, 4, 5, 6, 7, 8, 9, 10 or more) pressure ports are configured with septa that allow each valve to maintain a pressure when penetrated with a pressure introduction member, such as a needle. The pressure ports may be distributed along the network of microfluidic channels so as to allow selective control of fluid flow in different portions of the network as needed. In some embodiments, the cartridge includes at least two pressure ports that are maintained at different pressures during the assay so as to supply a motive force from the higher pressure to the lower pressure. The cartridge interface system may utilize various sensors and electronics (e.g., high speed camera, LCD, photo-diodes) that monitor flow rates and the system adjusts the pressure differential as needed to provide the optimal flow rates for performing the assay. In one aspect, the cartridge includes one or more translucent portions that allow for optical detection of fluid flow (e.g., droplets) moving through the microfluidic channels such that the pressure in one or more portions can be adjusted in response to optical detection of a characteristic of fluid flow (e.g., quantity or velocity) in order to provide a desired fluid flow to perform the assay. In some embodiments, multiple pressure ports are continually adjusted so as to provide differing pressure differential within differing microfluidic channels of the network so as to control flow rates separately in different channels, this is particularly advantageous when such channels combine in a process where flow of droplets between different channels alternate.

In the embodiment shown in FIGS. 2A-2B, the cartridge 100 includes multiple pressure septa 60 (12 total pressure ports with septa) in fluid communication with the microfluidic channels of the substrate 10 through corresponding pressure ports or channels extending through the cartridge body 30 and three open-user filled ports 5, 6. The cartridge can include one or multiple reservoirs pre-filled with reagents, each fluidly coupled with the microfluidic channels through one or more reagent supply channels, and one or more waste reservoirs coupled with the microfluidic channels at a down-stream location of one or more microfluidic channels. The cartridge shown includes 12 total reagent supplies and three total waste reservoirs. In certain aspects, the microfluidic cartridge configuration described allows the reservoirs to be substantially reduced in size as compared to reagent reservoirs in conventional assay processing devices.

In one aspect, the one or more valves are configured so as to be actuatable so as to allow fluid flow therethrough the microfluidic channels in a controlled manner so as to perform the assay. The one or more valves may be configured to actuate between the closed configuration and the open configuration upon movement of an actuating member or upon pressurization of the fluid contained by the valve. In another aspect, the cartridge device further includes a valve closing member that maintains the one or more valves in the closed configuration so as to isolate a fluid within the cartridge from adjacent microfluidic channels. Typically, the valve closing member is used to maintain one or more valves in the closed configuration after filling of one or more reservoirs with reagent so that the cartridge can be shipped to the user pre-filled while the reagent is maintained within the reservoir. The valve closing member may be configured in any number of ways, including as a movable mechanism (e.g., a piston, plunger or lever), a peelable layer (e.g., adhesive foil or polymer layer), or a movable structure or member attached to the cartridge that applies a closing force on each of the valves, such as described below.

In the embodiment of FIGS. 2A-2B, the valve closing member comprises a multi-pronged valve closing member or device that is removably attached to the cartridge 100, each of the multiple prongs 42 extending to a valve of the microfluidic channels from a laterally extending arm 43. In this embodiment, the one or more valves include a deformable or movable membrane such that positioning the foot of each prong 42 engages the membrane holds the valve in the closing configuration. This aspect can be further understood by referring to the valve in FIG. 5. The multi-pronged or multi-armed valve-closing member includes a prong 42 for each valve and includes one or more attachment mechanisms that interfaces with a corresponding attachment feature on one side of the cartridge. This allows the closing member 40 to be removably mounted on the cartridge 100 such that when mounted thereon, the prongs 42 of the closing member 40 engage each of the valves in the closed configuration. Each arm 43 that connects the prong 42 to a base 40 of the valve closing device is a beam that acts like a spring that sets the force at which the prong 42 presses against the valve 20. Thus, the force applied by the prong at each valve can be controlled or varied between valves by configuring the valve closing device accordingly, or alternatively, the device can be configured such that about the same force is applied at each valve. In the embodiment shown in FIGS. 2A-2B, the attachment mechanism 44 includes a pair of resilient retention tabs that resilient deflect outward when inserted into a corresponding notch or opening in the cartridge such that the valve-closing member 40 snaps securely into position such that the force exerted by each foot of the member on a respective valve is sufficient to hold a movable membrane of the valve in the closed configuration. Removal of the valve closing member 40 can be effected by manually squeezing the resiliently deflectable retention tabs together with two fingers and tilting the valve closing member until an opposite end can be withdrawn from a corresponding notch in the opposite side of the cartridge as the attachment feature.

Figure 3A:
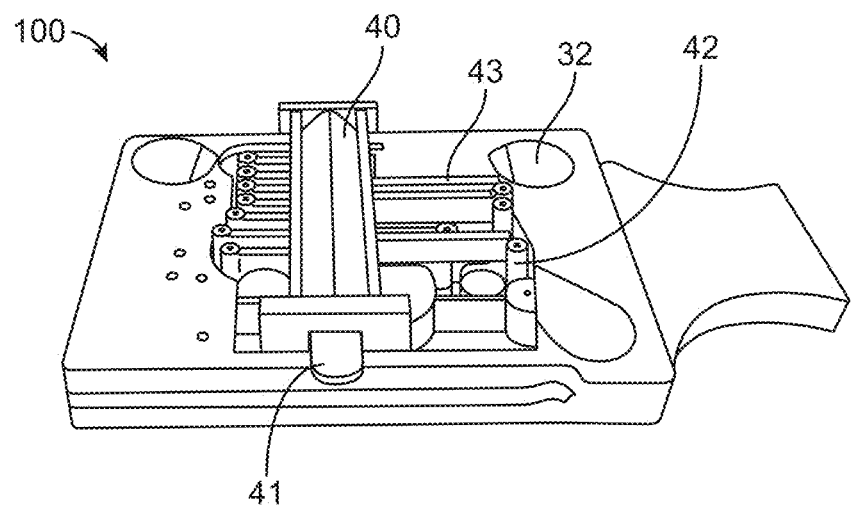
FIGS. 3A-3B illustrate an example reagent cartridge and associated packaging for shipping to a user in accordance with some embodiments.
Figure 3B:
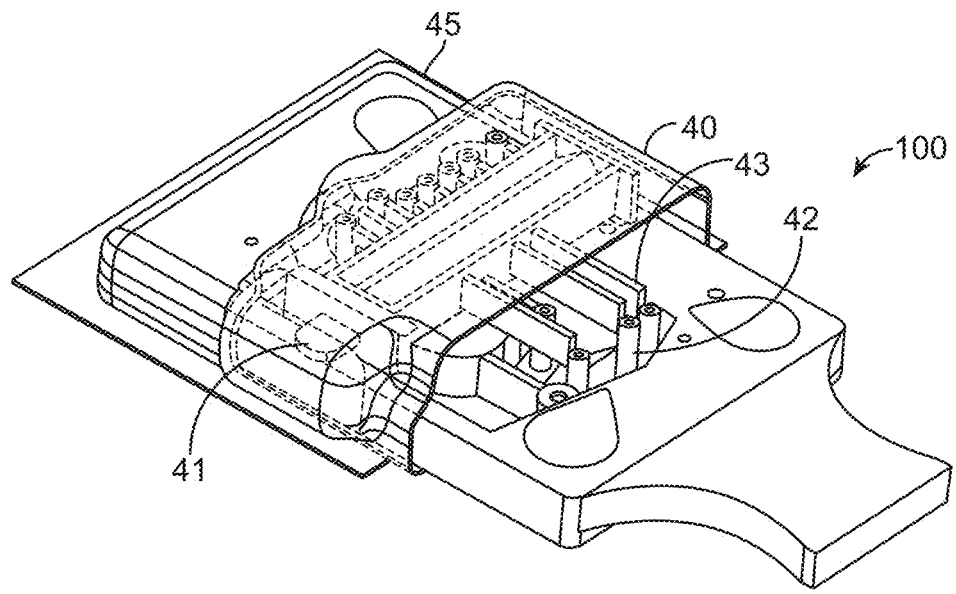

FIG. 3A illustrates an alternative example of a valve closing member 41 that is secured into position by a snap-fit or a friction fit. The valve closing member 40 includes a tab 41 on one or both sides that a user can use to exert a releasing force to effect removal of the valve closing device 40. Typically, the valve closing device 30 is used to maintain the one or more valves in the closed configuration in a cartridge having one or more reservoirs pre-filled with a fluid, such as reagent. Although in some embodiments, the valves are configured so as to be biased toward a closed configuration until the cartridge 100 is pressurized, the valve closing member 40 helps ensure the valves remain closed during shipping, since the cartridge may experience a wide range of pressures and forces during routine shipment, particularly when shipped by air freight. In some embodiments, in order to further ensure the valve closing member 40 remains in place during shipping, the assembled cartridge 100 having one or more pre-filled reservoirs and a valve closing member 40 attached thereto, may be shrinkwrapped 45, as shown in FIG. 3B, so as to prevent inadvertent removal of the valve closing member 40.

Figure 4A:
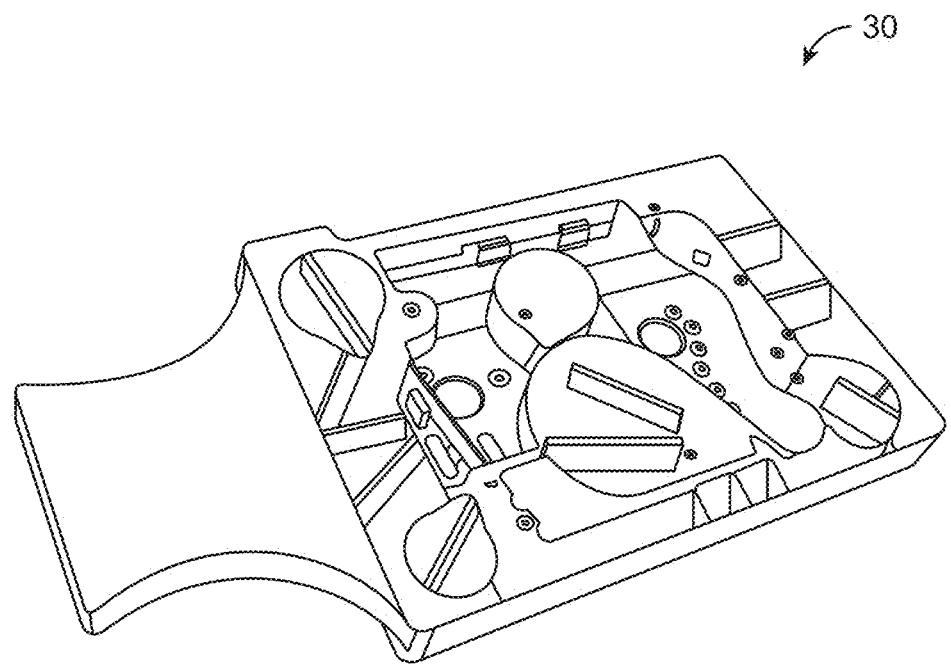
FIGS. 4A-4B illustrate a cartridge body and a reservoir formed in the example cartridge body of an example reagent cartridge, in accordance with some embodiments.
Figure 4B:
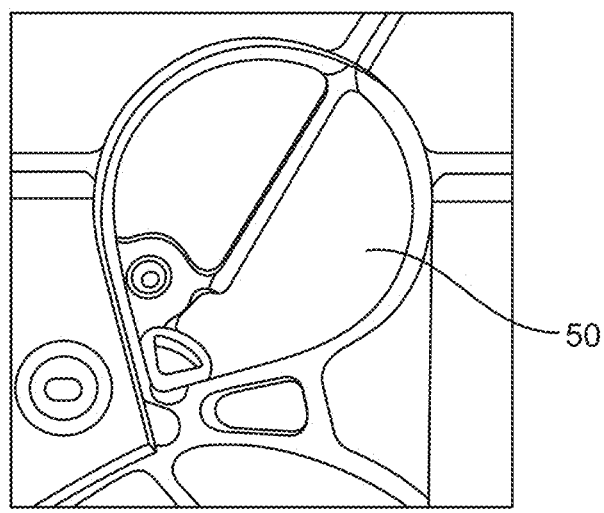

In some embodiments, such as that shown in FIG. 4A, the entire cartridge body 30 may be formed of multiple components, including a translucent component, or may be integrally formed or molded with a translucent material, such as cyclo-olefin polymer (COP). The cartridge body may be formed according to various methods. The cartridge body 30 defines multiple reservoirs, such as reservoir 50 shown in FIG. 4B. This configuration allows the same cartridge body 30 may be used in various cartridge 100 for performing different types of assay. For example, although the cartridge 100 shown in FIGS. 2A-2B includes multiple reservoirs, some cartridges may require use of only one reservoir pre-filled with a reagent to perform one type of assay, while certain other cartridges may utilize multiple reservoirs pre-filled with one or more other reagents according to the type of assay desired. In another aspect, the cartridge 100 may incorporate various inserts, such as rubber inserts that alter a volume or flow path defined by the cartridge body, thereby allowing the same cartridge body mold or design to be used in differing assay processes.

While the one or more valves may be configured in various different ways so as to allow controlled fluid flow therethrough, in one aspect, the valves are configured with a sealing membrane that seals the valve and isolates fluid flow through the valve. The valve is configured such that actuation of the valve comprises breaching of the membrane, such as by penetrating, breaking, deforming, flexing or moving the membrane, opens the valve to allow fluid flow through the valve and through the microfluidic channels downstream of the valve. In some aspects, the valves are configured so as to be biased towards the closed configuration such that fluid only flows if the pressure of the fluid is above a minimum pressure. This allows for improved control over the volume and velocity of fluid flow as desired for a particular assay.

Figure 5:
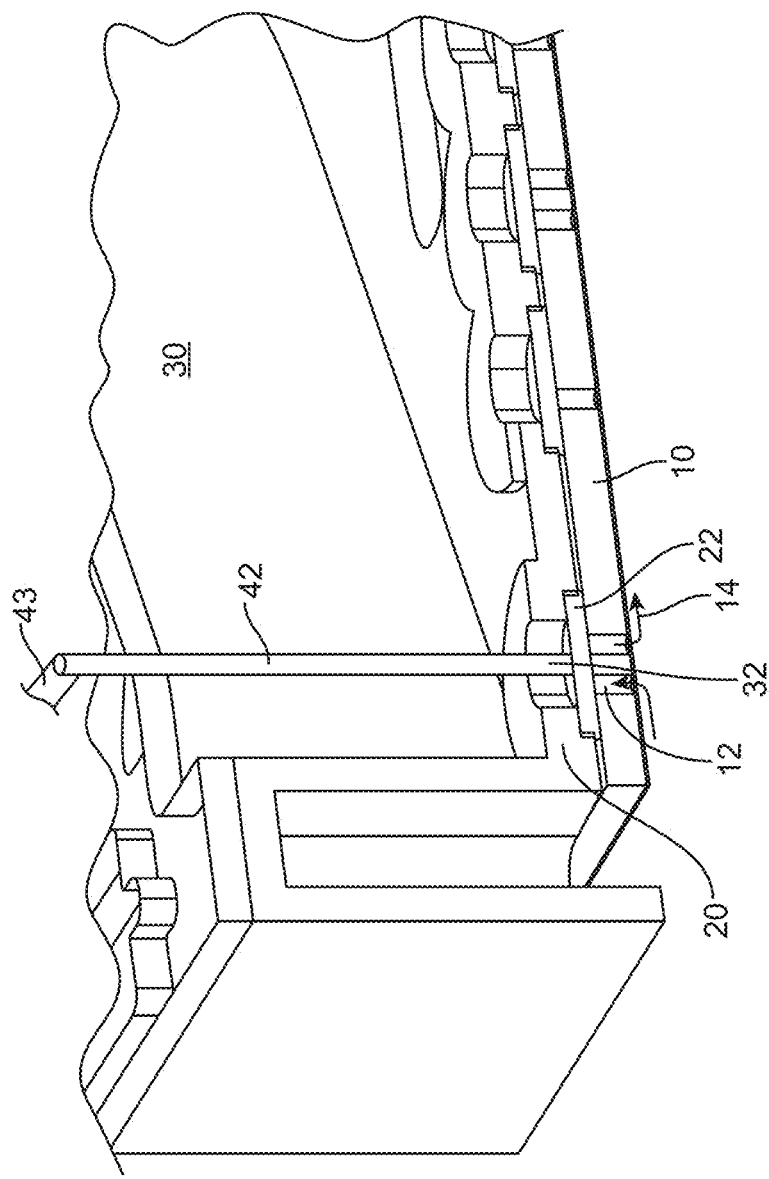
FIG. 5 illustrates an example valve of the microfluidic channels of a reagent cartridge, in accordance with some embodiments.

In one aspect, the valve is configured such that the sealing membrane 22 is confined between the microfluidic device 10 and the cartridge body 30 while a portion of the sealing membrane remains exposed or accessible so as to allow actuation of the valve as describe above. In the example shown in FIG. 5, the valve includes a deformable or flexible membrane, such as a flexible polymer layer, that resides within a pre-defined valve well of the cartridge body 30, trapped between the cartridge body 30 and the microfluidic device 10. The cartridge body 30 further includes an actuation aperture 32 that allows movement of the sealing membrane 22 to allow opening of the valve and also allows access of the sealing membrane 22 by the valve closing member, such as prong 42 of the valve closing device 40 in FIG. 2A. As shown in FIG. 5, the microfluidic channels may be defined such that the channel extends to the valve through an inlet 12 upstream of the valve and extends from the valve through an outlet 14 to the microfluidic channels downstream of the valve. When the sealing membrane 22 is sealed flush against the top surface of the microfluidic device, the membrane seals fluid in the inlet 12 from flowing through the outlet 14. By applying pressure to the membrane 22 with a foot of the prong 42 of the valve closing member 40, the valve is maintained in this closed configuration even if a pressure of the fluid in the inlet 12 increases. Once the valve closing member 40 is removed at run time, the sealing membrane 22 is movable between the closed configuration and open configuration such that sufficient pressurization of the fluid in the inlet 12 to the valve 20 causes the membrane 22 to flex or deform upwards, thereby allowing fluid flow from the inlet 12 through the outlet 14 and to continue along the microfluidic channel. The rate at which the fluid flows can be controlled by adjusting pressure introduced through the one or more pressure ports as needed. In one aspect, the valve 20 is configured such that, even when the valve closing device 40 is removed, the valve" holds" (prevents flow through the valve) at 20 psi in the closed configuration and "holds" 100 psi when in the open configuration. These pressures are but examples and it is appreciated that the valves could be configured to hold at various other pressures (e.g., higher or lower) as desired. In this context, "holds" means preventing flow through the valve (e.g., does not fail, leak or burst) at the noted pressure. This may prevent inadvertent fluid flow once the closing member is removed or after filling of the reagent reservoir, as described further below.

Figure 6:
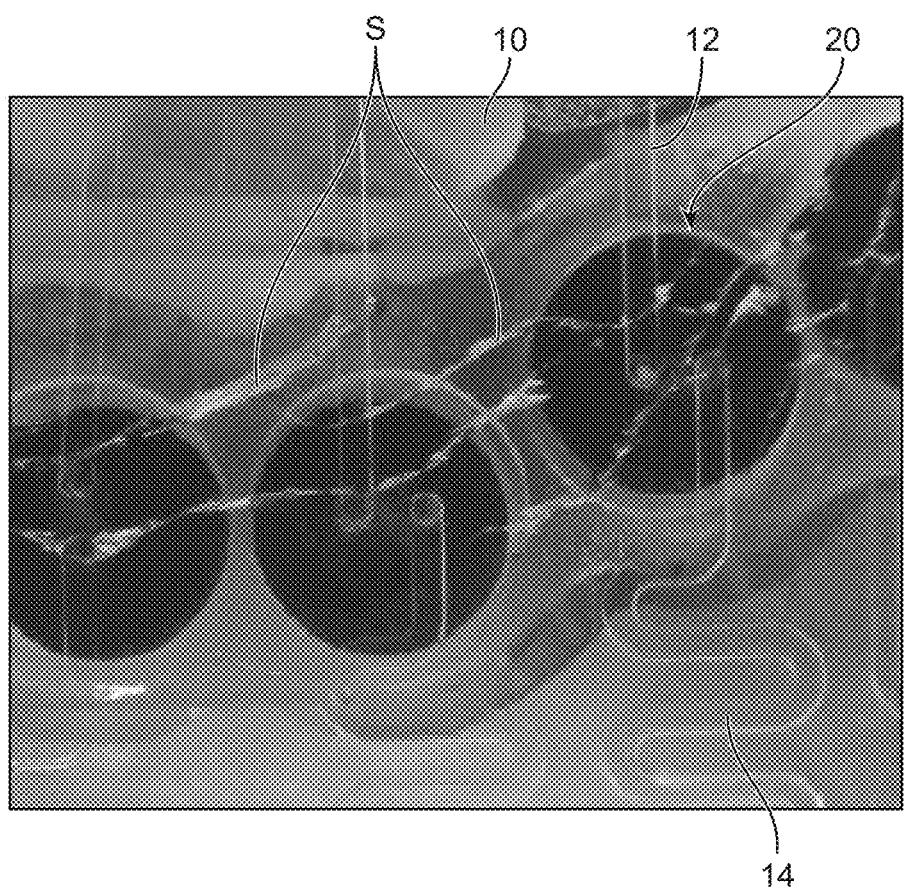
FIG. 6 illustrates stress cracking that may occur near valves within a microfluidic device.

In one aspect, the cartridge device includes one or more transparent or translucent portions at one or more detection points to allow for optical detection of fluid flowing through the microfluidic channels and/or for optical detection. In some embodiments, the detection points include portions fabricated from cyclo-olefin polymer (COP) so as to enhance detection by improving autofluorescence properties. While use of COP for the microfluidic device is advantageous due to its autofluorescence properties, use of COP presents certain challenges when used as a structural material since COP typically has reduced strength and/or durability as compared to various other substrate materials. For example, when COP is used as the substrate material, when positioning multiple valves along the channels in the substrate that are actuated by application of pressure in a direction transverse to the substrate, stress cracks S may develop, as shown in FIG. 6.

Figure 7A:
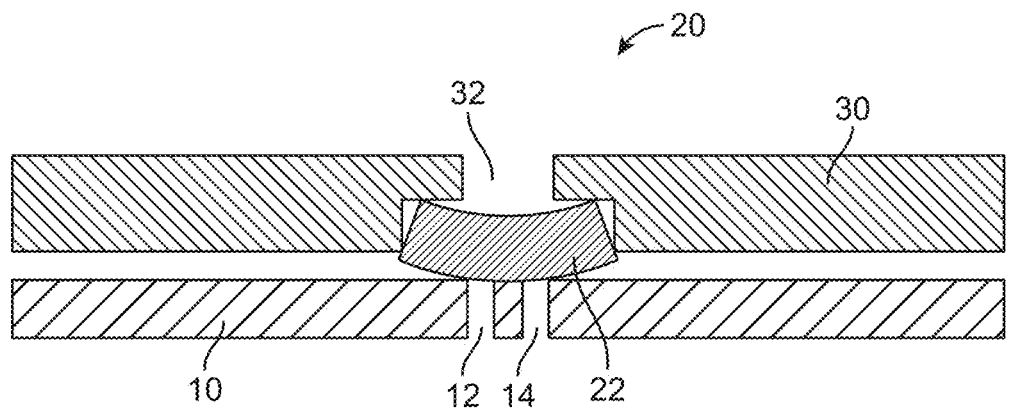
FIGS. 7A-7D illustrate example valves for use in the microfluidic channels of a reagent cartridge in accordance with some embodiments.

FIGS. 7A-7D illustrate example valve designs that address these challenges as well as provide improved sealing of the valve. FIG. 7A illustrates a valve in which the deformable membrane 22 is configured with a residual radial compression, which can be accomplished by using a deformable membrane 22 having a concave shape that curves outward towards the microfluidic device 10. While described here as concave, it is appreciated that the membrane could also be convex. Since the membrane is being radially overfilled, the membrane could be configured to either pop out (when concave) or pop in (convex) when opening and closing the valve. The amount of radial compression provided by the membrane 22 determines the minimum pressure present in inlet 12 before the deformable membrane 22 bows upwards so as to let fluid flow under the membrane 22 and into the outlet 14. This also reduces the closing force required to maintain the valve in the closed position, thereby reducing the stresses applied to the microfluidic cartridge by the valve closing member.

Figure 7B:
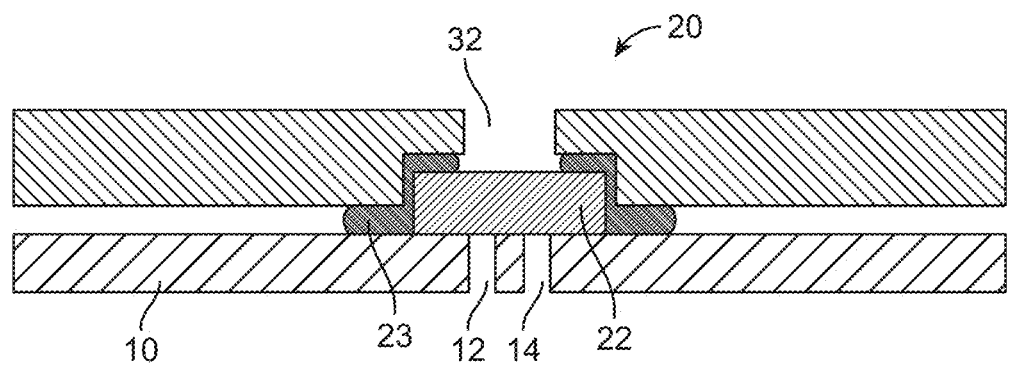

FIG. 7B illustrates a valve 20 in which the deformable membrane 20 is seated or potted in place with an epoxy layer 23. This improves the sealing of the valve 20, which may allow the valve to withstand higher pressurization within the microfluidic channels without leakage. Improved sealing also reduces the closing force required to maintain the valve in the closed position, thereby reducing the stresses applied to the microfluidic cartridge by the valve closing member.

Figure 7C:
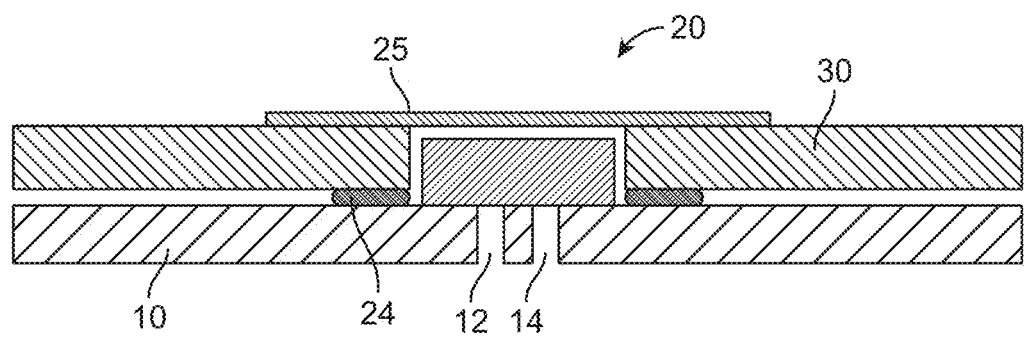

FIG. 7C illustrates an embodiment in which the valve 20 is sealed by an additional adhesive layer 25 applied over the deformable membrane 20. The adhesive layer 25 may be foil or a polymer layer having an adhesive compatible for adhering to the cartridge body material. This may be used in conjunction with a valve closing member or may be used in lieu of. Before use, the user would peel back and remove the adhesive layer 25, thereby exposing the deformable membrane 20 so as to allow the membrane to deform outward upon pressurization of the cartridge. The cartridge body 30 may also be bonded to the microfluidic chamber with an adhesive 24 or other suitable means of bonding the components together. These features improve sealing such that the valve closing force by the valve closing member is reduced, thereby reducing likelihood of stress cracks in the microfluidic device 10.

Figure 7D:
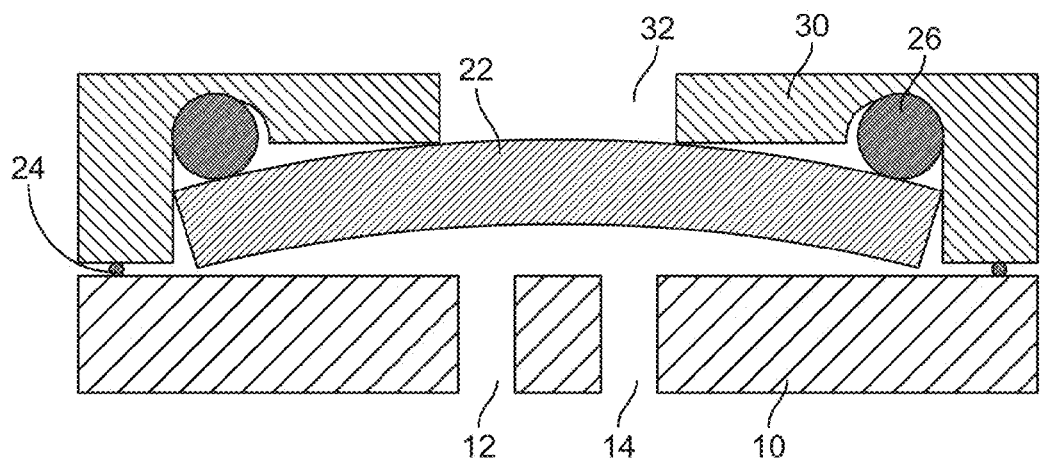

FIG. 7D illustrates another example valve design in which a ring of adhesive 26 is disposed in a circular groove circumscribing the valve well in which the deformable membrane 22 is disposed. When the fluid pressure in inlet 12 is increased, the valve 20 opens, the membrane 22 flexing upwards to allow the fluid to flow freely from the inlet 12 into outlet 14 and through the downstream microfluidic channel. As the membrane flexes upwards, the ring of adhesive 26 secures the edges of the membrane against the top surface of the microfluidic device so as to seal the fluid flowing from inlet 12 into outlet 14 without leaking. In addition, adhesive 24 may be used to bond the cartridge body 30 to the microfluidic device 10 to further enhance sealing. Improved sealing reduces the closing force required to maintain the valve in the closed position, thereby reducing the stresses applied to the microfluidic cartridge by the valve closing member. Field testing in which droplets hydrofluoroether (HFE) or other suitable type of oil were ran through the valves indicated that this particular configuration withstood 80 psi with HFE fluid present in the open configuration, and withstood 20 psi in the closed configuration with HFE fluid present (without use of a valve closing device). Although HFE was used it is appreciated that various other suitable types of oil may be used. Field testing also indicated that the valve configurations of FIG. 7A and FIG. 7B indicated sealing at similar pressure ranges.

Figure 8A:
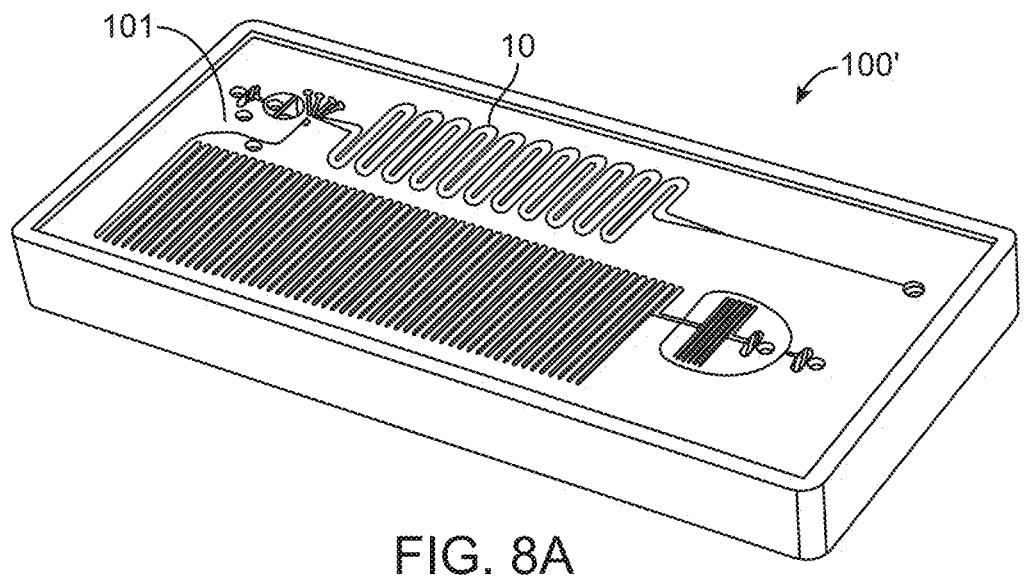
FIGS. 8A-8B illustrate an alternative example reagent cartridge in accordance with some embodiments.
Figure 8B:
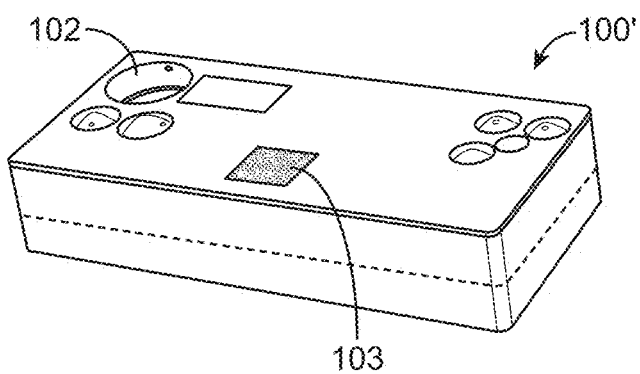

FIGS. 8A-8B illustrate another example of a reagent cartridge 100' in accordance with embodiments of the invention. As shown in FIG. 8A, the cartridge device 100' includes an incorporated microfluidic device 10 shown on an underside 101 of the cartridge device, which is pre-filled with one or more reagents required for a microfluidic process. In some embodiments, the cartridge device 100 is configured to allow the end-user to introduce additional reagents at the time of use, including without limitation samples to be tested, or additional reagents with shelf lives too short to allow packaging in the cartridge at the time it is manufactured. Prior to use, the contents of the reservoirs 102 may include, without limitation, DNA and other biological substances, cells or media, diluents, emulsions, or be empty in order to accommodate accumulation of waste during use. FIG. 8 shows an embodiment of the invention, with a view of the microfluidic channels 101 of the microfluidic device 10 on one side of the device, and FIG. 8B show the other side of the cartridge 100' on which is disposed one or more open reagent wells 101 on the other side of the cartridge device. The cartridge also includes a unique barcode 103 for identification purposes.

In another aspect, the valves according to various other configurations may be used, including valves utilizing a deformable membrane, frangible membranes, removable membranes, or a thin membrane that is easily punctured by a pressurization device. In some embodiment, the valve includes a deformable membrane that separates a pressurized chamber and the working fluid to be driven across a microfluidic device. The junctions are sealed so that the pressurized chamber's working fluid is not in contact with the working fluid that is driven. When hydrostatic pressure is applied to the pressurized chamber, the membrane deforms, imparting a pressure that is used to drive the working fluid; this type of valve is described is shown in FIG. 5. An alternate embodiment is to replace the membrane with a gas permeable seal allowing air to pass through but preventing liquids from leaking out.

Figure 9A:
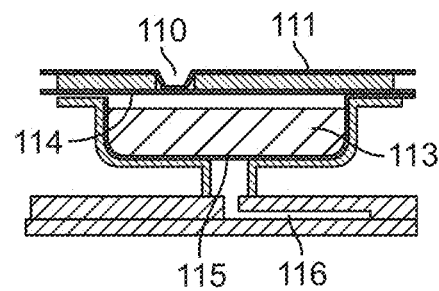
FIGS. 9A-9C illustrate alternative example valves for use in the microfluidic channels of a reagent cartridge in accordance with some embodiments.
Figure 9B:
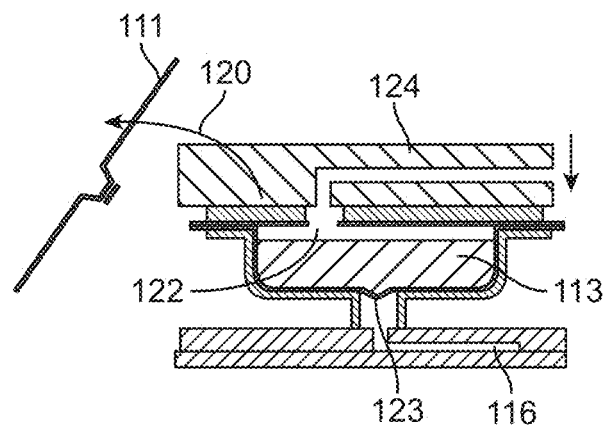
Figure 9C:
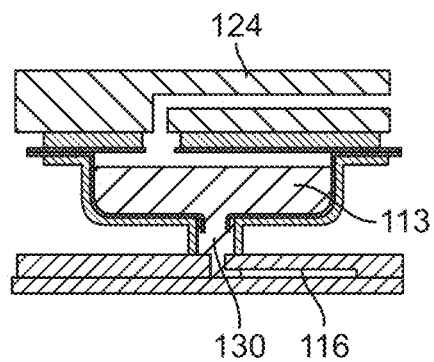

In another embodiment, the valve includes a frangible membrane that breaks when the fluid in the reservoir is pressurized. FIG. 9A-9B show a pre-filled individual reagent reservoir 113 of a cartridge and a scheme for connecting the sealed reagent reservoir to a pressure source 124 to the microfluidic device of the cartridge at the time of use. As shown in FIG. 9A, the reagent in the pre-filled reservoir 113 is sealed with a frangible membrane 114 on the pressure side and a frangible membrane 115 on the process side leading to the microfluidic channels. On the pressure side, the frangible membrane 114 is selectively adhered to a user-removable membrane 111 only in the location of the pressure port where the pressure source is to be connected, such that when the user removes the removable membrane, it also tears open the pressure port 122 in the frangible membrane 114, as shown in FIG. 9B. The system then clamps the pressure manifold 124 to the cartridge, which connects the pressure source to the opened pressure port 122. Increasing pressure is applied to the fluid within the reservoir until the seal 115 between the reservoir and the microfluidic device begins to deform 123, before rupturing 130, as shown in FIG. 9C. The pressure source is then adjusted to provide the desired operational flow of the reagent into the system according to the desired assay.

Figure 10A:
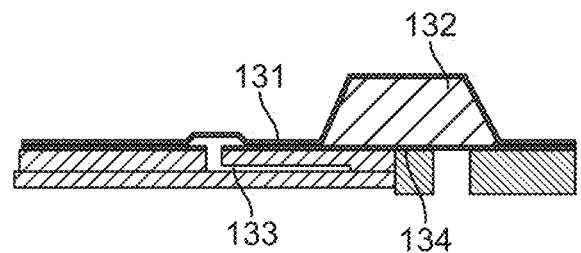
FIGS. 10A-10C illustrate alternative example valves for use in the microfluidic channels of a reagent cartridge in accordance with some embodiments.
Figure 10B:
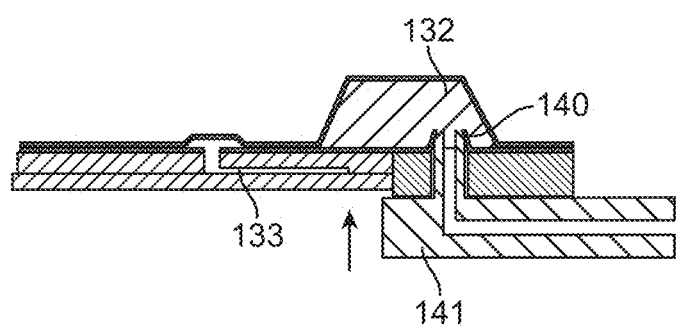
Figure 10C:
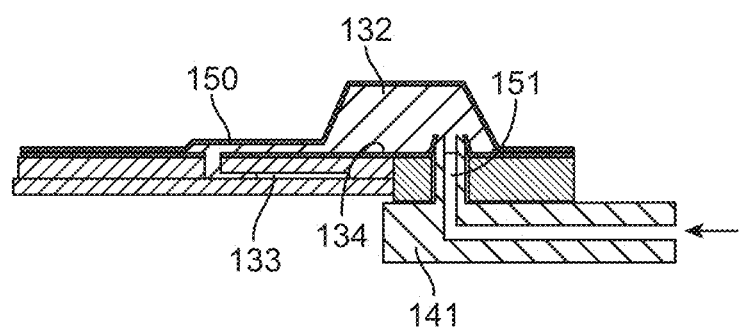

In another embodiment, the cartridge includes a reservoir sealed between two membranes, at least one of which also defines the valve through which the reagent flows into the microfluidic cartridges from the reservoir. FIGS. 10A-10C show an individual reservoir formed by two membranes and a scheme for connecting the sealed reagent to a pressure source as well as the microfluidic device of the cartridge at the time of use. The reagent reservoir 132 is formed by two membranes 132 and 134 that seal the reagent within the reservoir 132. This seal is designed to hold the absolute system maximum pressure, except along a path 131 between the reservoir and an inlet opening 133 connected to the channels of the microfluidic device. Along that path, a special adhesive or bond may be used that maintain the reservoir seal before use. The sealed path 131 acts as the valve 20 in this embodiment. At the time of use, the adhesive can be released, for example by bursting when pressure within the reservoir is increased, by external application of heat, or by mechanically moving the membrane. In the embodiment shown, when the cartridge is loaded into the system for use, as illustrated in FIG. 10B, a hollow needle 140 of the pressure source punctures one of the membranes of the reservoir and introduces pressure 151 into the reservoir, which in turn opens the valve 20. More specifically, the adhesive in the sealed channel 131 is released as the fluid pressure forces the channel open, and the reagent flows into the microfluidic device from the reservoir, as illustrated in FIG. 10C.

Figure 11A:
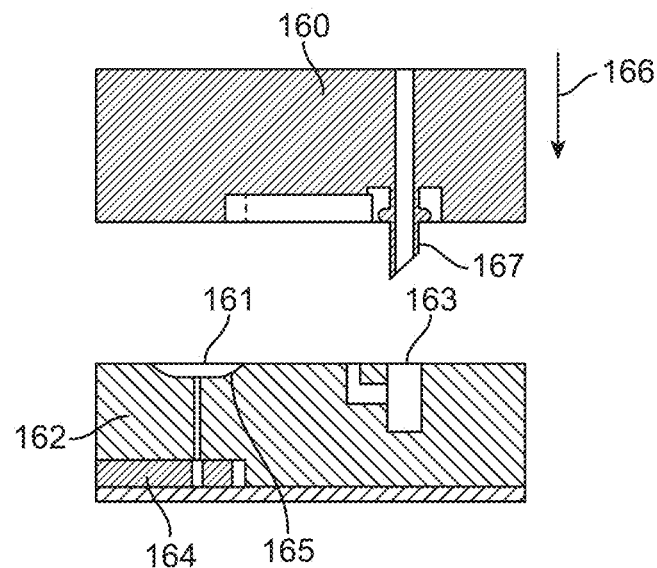
FIGS. 11A-11B illustrate alternative example valves for use in the microfluidic channels of a reagent cartridge in accordance with some embodiments.
Figure 11B:
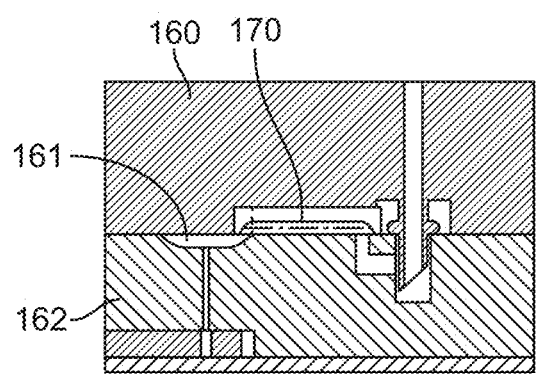

In another embodiment, the cartridge includes a pre-filled individual reservoir that is fluidly coupled with the microfluidic channels through a valve comprising a frangible channel. FIGS. 11A-11B illustrate an individual reservoir and a corresponding scheme for connecting the motive pressure to open the valve between the reservoir and microfluidic channels at the time of use. Two reservoirs are formed, in a rigid form, one being a reagent reservoir 165 and another reservoir 163 containing only air. This reservoir functions as a pressurization channel into which a needle or needle like device 167 can be introduced. These two reservoirs are again connected by a frangible channel 170 that is sealed before use but can be opened by pressure or other effect, under control of the system using the cartridge. The reagent reservoir in the illustration is already connected to the microfluidic device 164. When the cartridge is loaded, a pressurization needle 167 attached to the pressure manifold 160 punctures the pressurization reservoir 163 and seals to it. Alternatively, the reservoir may be sealed with a self-sealing septum, which the pressure manifold needle will puncture. The adhesive in the frangible channel 170 is then released and the pressure applied through the needle opens the channel, eventually pressurizing the reagent reservoir, as shown in FIG. 11B. The reagent is then pushed into the microfluidic device 164 by the increased pressure. If a self-sealing septum is used as the reservoir seal, it can help to wipe the pressurizing needle as it is withdrawn when the cartridge is to be removed.

In another embodiment, the cartridge includes a valve of a microfluidic channel that includes a movable membrane and a valve closing member. As shown in the example of FIGS. 12A-12B, similar to the valve configuration shown in FIGS. 5 and 7, the valve may include a membrane that is movable from a closed configuration, in which fluid is sealed within the inlet 12, to an open configuration in which fluid flow freely from the inlet 12 to the outlet 14. The movable membrane 22 may held in place against the top surface of the microfluidic device 10 by the cartridge body attached to the microfluidic device (or disposed therebetween) such that in the closed configuration (see FIG. 12B, the membrane seals fluid within the inlet 12 and inhibits flow into the outlet 14. When moved to the open configuration, a portion of the membrane moves away from the microfluidic device so that fluid flows from the inlet 12 and through the outlet 14 into the downstream network of microfluidic channels (see FIG. 12A). In some embodiments, the movable membrane may be configured such that the membrane remains sealed until a certain fluid pressure is reached within the inlet. To facilitate closing of the valve 20 or to ensure that the valve 20 remains closed after a reagent reservoir is filled before shipping, the cartridge may include a valve closing actuator or member 46 that applies pressure to the membrane 22 so as to seal the valve 20 in the closed configuration. To actuate the valve and open the valve at run time, the valve closing member 46 may be moved, withdrawn or detached entirely from the cartridge. The valve closing member may be configured as a prong of a multi-armed device, as described above, or configured as a separately movable finger or other such member. In FIG. 12A, the valve is open and fluid can pass though the microfluidic pathway. In FIG. 12B, the valve closing member or actuator 46 has compressed the valve membrane 22 over the inlet hole 12, blocking the fluidic pathway.

In this embodiment, the microfluidic pathway on which a valve is desired is split into two sections. Each section ends in a channel (typically a hole) that runs perpendicular to the plane of the microfluidic, starting at the microfluidic pathway and ending at the opposite surface of the device. The holes from each section of the pathway are covered by a single membrane, which is sealed around its edges. This may create a pocket that contains both holes and completes the connection between the two sections of the microfluidic pathway. Minimizing the size and spacing of the holes, the unsealed area that connects them, and the volume of the valve structure is often advantageous considering the very small amounts of fluid typically used in a microfluidic device. The membrane can be made from one of several classes of materials, including rubbers and plastic or polymer films. In some embodiments, the membrane material has some elasticity so that the flow pressure of the fluid can deform or displace it outward to create the flow pocket through the valve. The membrane can be sealed using adhesives (e.g., epoxies, glues, or transfer tapes), welded (e.g., by laser, thermal or chemically), or an additional piece can be used to compress the membrane and create a seal.

To close the valve, a valve closing member or actuator is placed against the pocket connecting the two holes. This action may obstruct the passageway created by the membrane. The actuator can made of a hard material such as plastic, metal, or glass, or it can be made of a soft material, such as rubber. The location of the force applied by the actuator can either be over a hole, in which case the seal is made around the circumference of the end of the hole, or between the holes, where the passage between the holes must somehow be sealed off. If the valve is elastically deformed by the actuator, then removal of the actuator will reopen the valve. If the valve is plastically deformed by the actuator, then the valve will remain closed permanently.

In some embodiments having multiple valves, the cartridge includes multiple valve closing members corresponding to the multiple valves. The multiple valve closing member or device may be separate or integrated within a single valve closing member having multiple members extending therefrom, such as that shown in FIGS. 2A-2B. Typically, such a valve is disposed the microfluidic channel between a pre-filled reservoir and downstream microfluidic channels, however, it is understood that such valves may be used in various other locations, such as anywhere within the network of microfluidic channels where control of fluid flow is desired.

Figure 13:
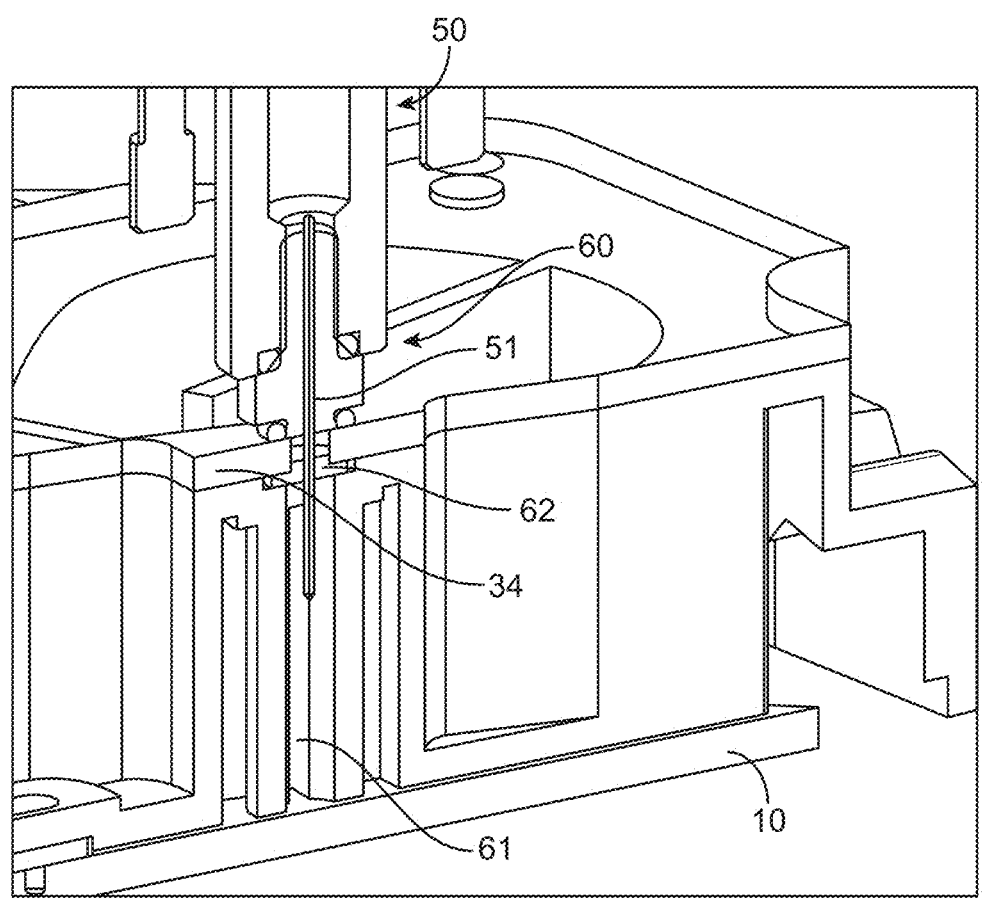
FIG. 13 illustrates an example septum for use in the microfluidic channels ports of a reagent cartridge in accordance with some embodiments.

FIG. 13 illustrates an example septum construction for a cartridge device in accordance with some embodiments. The septa may be used in any or all of the pressure ports for use in introducing pressure into the cartridge and maintaining the desired pressure. In some embodiments, the septa may also be used in one or more user fill ports used to introduce fluid sample or one or more enzymes into the cartridge, while in other embodiments the user fill ports may remain open. In the embodiment shown, the septum includes a membrane 62, such as a polymer or rubber disk, that is capable of being penetrated by an instrument needle 51 to allow insertion of fluid but thick enough to maintain a minimum pressure within the channel in which the fluid is inserted.

In one aspect, the cartridge body and microfluidic device 10 are bonded together so that the cartridge body seals the microfluidic channels of the device 10. Bonding is performed so that the sealed microfluidic channels can hold up to 100 psi. The components may be bonded together using various suitable bonding media and bonding methods, including but not limited to various epoxies, transfer tapes, UV cure adhesive, glues, adhesives, laser weld, PIBS and solvent bonding.

Figure 14A:
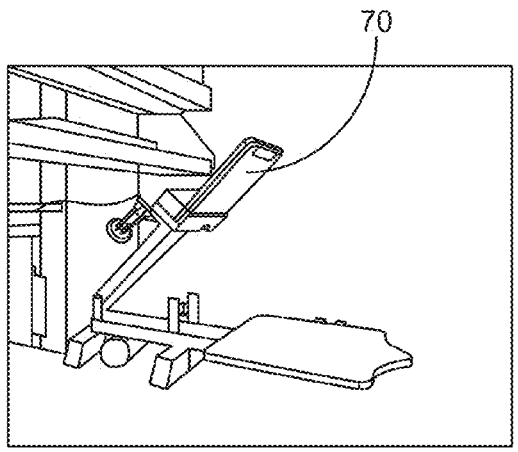
FIGS. 14A-15B illustrate examples of adhesive bonding applications for use in reagent cartridge construction in accordance with some embodiments.
Figure 15A:
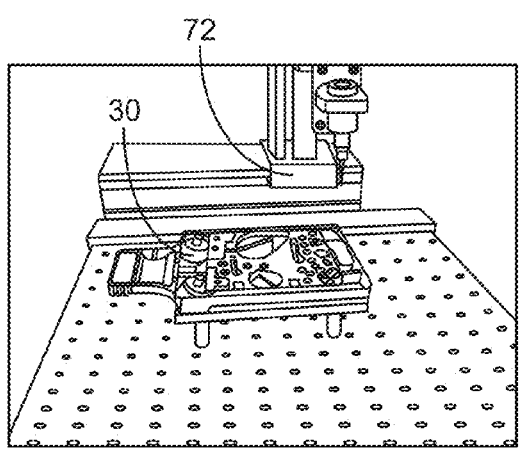
Figure 14B:
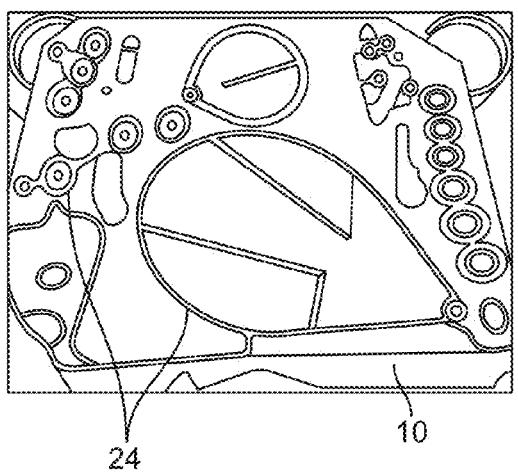
Figure 15B:
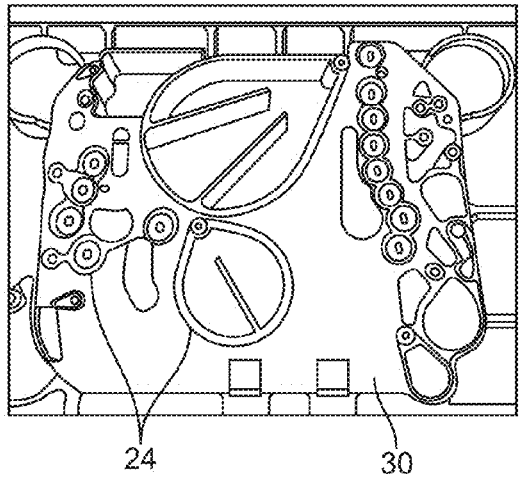

Example bonding methods that may be used in assembling the cartridge components are shown in FIGS. 14A-14B and FIGS. 15A-15B. FIGS. 14A-14B illustrate a silk-screen device 70 that can be used to deposit an intricate pattern of adhesive or transfer tape on a planar components, such as the top plate or the microfluidic device, for bonding with the corresponding geometry of the cartridge body. FIGS. 15A-15B illustrates a glue robot 72 which can be used to automatically deposit a glue or adhesive 24 directly on the surfaces of the cartridge body that contact the plate and/or the microfluidic device 10.

Figure 16:
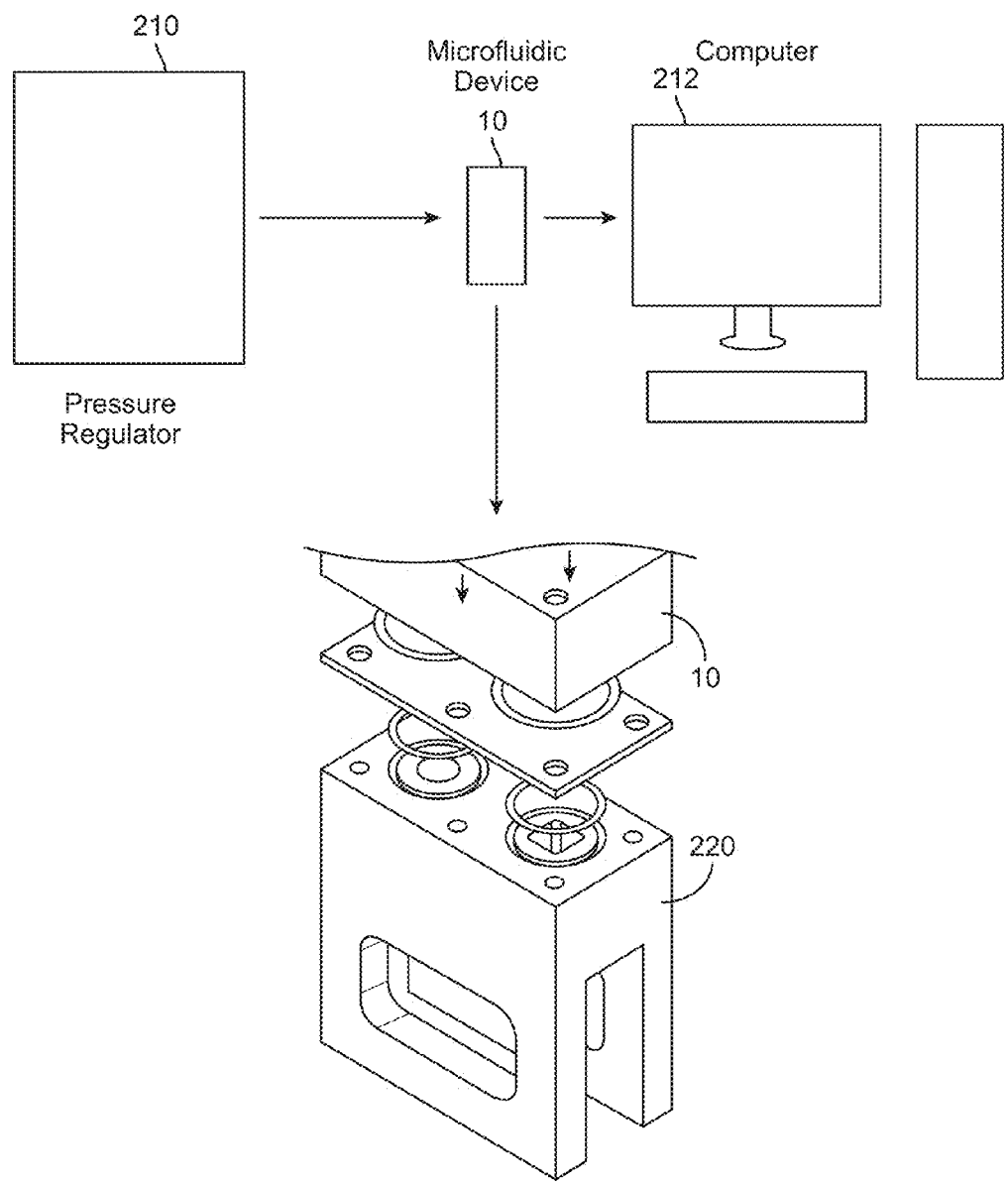
FIG. 16 illustrates an overview of an example reagent cartridge for use within an assay system in accordance with some embodiments.

FIG. 16 illustrates a system where a tank or pressure regulator 210 is connected to a microfluidic device 10 as well as a computer 212 that obtains data through various sensors of the cartridge interface device in order to control the PCR assay process and/or to analyze the results. As illustrated in FIG. 16, when the cartridge is received with the cartridge interface device, the microfluidic device 10 is coupled with various cartridge interface components 220 that seal and align the pressure ports with pressure supplies of the cartridge interface device. The cartridge interface device includes a tank or pressure reservoir that is connected to a pressure regulator 210 that allows the system to precisely control the pressure introduced into the microfluidics of the cartridge thereby controlling the pressure before the deformable membrane of the one or more valves of the microfluidic channels. Across the chamber, a respective membrane of a valve moves when the cartridge is sufficiently pressurized or inflated so as to impart a portion of the inlet pressure onto the microfluidic device working fluid, which is located under the membrane, thereby causing fluid to flow across the valve. As the fluid flows, the membrane deforms at a volume corresponding to the displaced volume of the fluid. This system can be integrated so that fluidic interconnects connect a driving apparatus, such as a pressure regulator to the microfluidic cartridge device, as depicted in FIG. 16.

Figure 18:
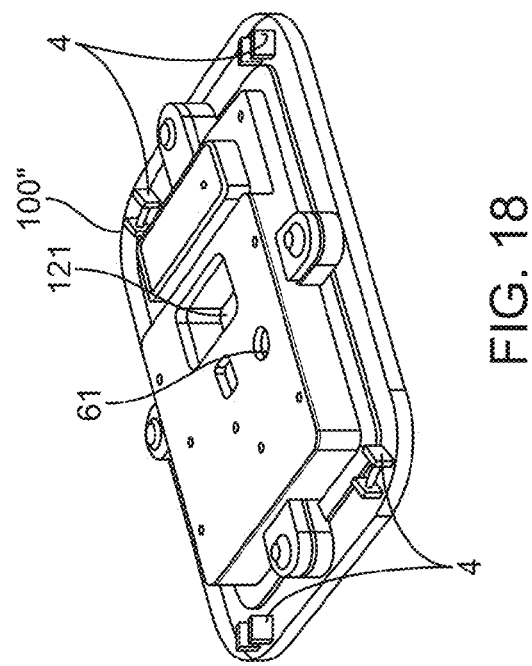
FIGS. 17-18 illustrate a cartridge interface and alternative reagent cartridge, respectively, for use within an assay system in accordance with some embodiments.
Figure 17:
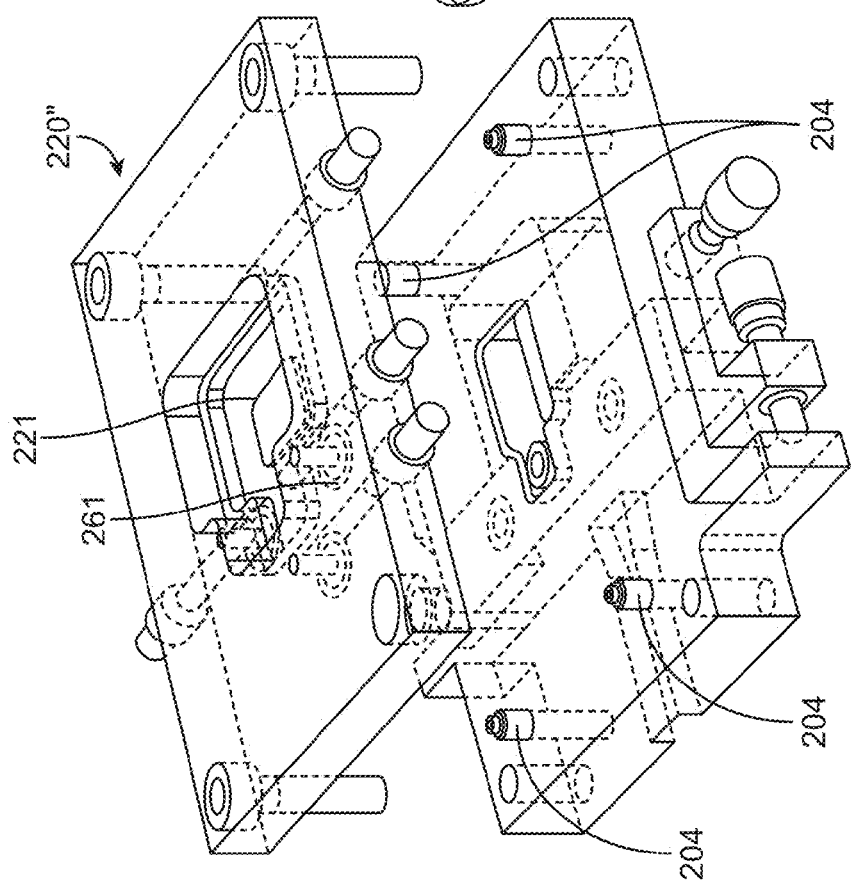

In certain embodiments, the system is designed so that the fluids are integrated directly onto a consumable microfluidic device cartridge that contains reagent volumes, separated from a driving pressure chamber by a valve. Such a valve may include any of the designs described herein, including the deformable membrane design. This effectively allows sealed delivery of a reagent volume and a driving mechanism for microfluidic flows that is precisely controllable and easily to integrate into a functional system. The cartridge is designed with one or more pressure ports that are coupleable with a pressure source when the cartridge is engaged within a cartridge interface device 200, such as that shown in FIG. 17 for interfacing with the example cartridge 100" in FIG. 18. The example cartridge 100" includes a reservoir pre-filled with a reagent separate from microfluidic channels of the cartridge through one or more valves, a pressure port 61 for introducing pressure into the cartridge to facilitate controlled fluid flow through the microfluidic channels and a window 121 through which the fluid flow can be monitored and/or the target analyte can be detected. In some embodiments, the cartridge interface includes one or more sensors, electronics, such as high speed cameras, photo-diodes, and one or more pressure needles for insertion into the pressure ports of the cartridge. The cartridge 100" and the cartridge interface 200" are configured such that when the cartridge 100" is inserted into a receptacle of the cartridge interface device 200," the various sensors, electronics and pressure needles engage or align at pre-determined positions on the cartridge in order to facilitate the controlled assay process automatically. Each of the cartridge and cartridge interface components may include releasable attachment and alignments features to ensure that the cartridge properly interfaces with one or more pressure sources and the one or more sensors, such as an optical sensor adjacent the optical detection window. For example, the cartridge may include four holes 4 in each corner of the cartridge that receive four corresponding pegs 204 in the cartridge interface. It is appreciated that this is but one example of interfacing and aligning the cartridge 100" within the cartridge interface device 200" and various other features or approaches may be used in accordance with embodiments of the invention.

In one aspect, the cartridge is provided for use in a system for performing various types of assay, for example a cascading assay. In this example, a two-stage integrated emulsion-based microfluidic system is illustrated, wherein the system may be used to perform a cascading assay comprising a first stage and a second stage, as discussed in greater detail below. The system in this example provides for the performance of various functions, including but not limited to, target nucleic acid selection and amplification, assay, detection and data analysis. However, the system, samples and reagents may be modified accordingly to perform any type of assay The reagent reservoirs in the cartridge can be designed to accommodate many sources of motive power and control for fluid flow. For example and without limitation, one method is to introduce pressurized air or gas directly into a reservoir, of fixed volume, forcing out the fluid stored in it through another opening in communication with the microfluidic device. Another method would be to use a plunger or piston extendable into the reservoir to effect a positive displacement of fluid by controlled movement of the plunger or piston. Yet another method would be to construct a fixed volume with an elastic partition, the being reagent stored on one side of the partition in communication with the microfluidic channels, and a controlled source of compressed air or fluid connected to the other.

In certain aspects, the reagent reservoirs are sealed to the microfluidic device, allowing elimination of any tubes, connectors, or intermediate containers that could leak, introduce contaminants, trap air that is difficult to purge, or require substantial volumes of reagent to prime. Reagents are sealed into the reservoirs to protect against rupture during shipment or handling, to be opened at the time of use and driven into the system. Multiple seals may be employed to accommodate the degree of sealing required for the particular reagent, and the method employed for driving the reagents into the microfluidic device. As examples and without limitation, these seals may lie between the reagent and the connection for motive pressure, or between the reagent and the microfluidic device; the seals may take the form of mechanical valving or clamping elements, sealed channels released by applied heat, sealed channels opened by pressure, or frangible elements burst by pressure.

Reservoirs may take several forms appropriate to the amount of reagent to be stored. For example and without limitation, large reservoirs of 100 µL to 100 mL may be formed in a rigid part and sealed with a laminate; smaller reservoirs of 100 nL to 50 µL to may be formed as a vesicle sealed between two laminates; very small reservoirs may simply be capillaries or passages sealed at both ends.

Filtering elements may be incorporated into the cartridge, placed so as to filter user-loaded reagents before they reach the microfluidic device, or to filter gases used in contact with reagents, such as pressurized gases used to drive fluid flow. Other filtering elements may also be built into the microfluidic device if reagent manufacturing and cartridge filling cannot provide sufficient assurance that no harmful particulates are present in a particular reagent reservoir. Where the motive power for fluid flow is provided by a controlled supply of pressurized gas, the cartridge may additionally incorporate filtering elements placed between the pressure connection and the fluid reservoir itself.

In one aspect, the cartridge is shipped pre-filled with fluids, such as one or more reagents, in one or more reservoirs or may be pre-filled with various other suitable fluids, such as HFE, within the microfluidic channels, with or without surfactant.

It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein are hereby incorporated by reference in their entirety for all purposes.

The invention claimed is:

1. A microfluidic cartridge interface device comprising:
    an enclosure configured to receive a microfluidic cartridge within a receptacle thereof, the microfluidic cartridge having one or more pressure septa in fluid communication with a network of channels to facilitate controlled flow of one or more reagents and/or a fluid sample through the network of channels upon introduction of pressure through the one or more pressure septa;
    an alignment feature within the receptacle configured to engage with a corresponding alignment feature of the microfluidic cartridge to facilitate alignment of the microfluidic cartridge within the receptacle; and
    one or more pressure needles arranged at pre-determined positions corresponding to the one or more pressure septa of the microfluidic cartridge when aligned within the receptacle.

2. The microfluidic cartridge interface device of claim 1, further comprising:
    a pressure source coupled with the one or more pressure needles.

3. The microfluidic cartridge interface device of claim 2, wherein the pressure source is coupled with a pressure regulator so as to provide controlled pressurization of the one or more pressure needles.

4. The microfluidic cartridge interface device of claim 1, wherein the one or more pressure needles are configured to advance into the receptacle of the enclosure while the microfluidic cartridge is aligned within the receptacle to facilitate insertion into the one or more pressure septa of the microfluidic cartridge.

5. The microfluidic cartridge interface device of claim 1, wherein the one or more pressure needles comprise a plurality of pressure needles arranged that correspond to a plurality of pressure septa of the microfluidic cartridge when aligned within the receptacle.

6. The microfluidic cartridge interface device of claim 5, further comprising:
a pressure regulator coupled with the plurality of pressure needles and configured to provide a particular sequence of pressurization of the pressure needles corresponding to controlled pressurization within the microfluidic cartridge associated with performing an assay.

7. The microfluidic cartridge interface device of claim 1, further comprising:
an attachment feature within the receptacle configured to releasably secure the microfluidic cartridge when aligned within the receptacle.

8. The microfluidic cartridge interface device of claim 1, further comprising:
one or more sensors arranged within the receptacle at pre-determined locations corresponding to locations on the microfluidic cartridge when aligned within the receptacle.

9. The microfluidic cartridge interface device of claim 8, wherein the one or more sensors include an optical detector.

10. The microfluidic cartridge interface device of claim 9, wherein the optical detector comprises a camera or a photodiode.

11. The microfluidic cartridge interface device of claim 8, wherein the one or more sensors are configured to identify a cartridge or an associated assay when the microfluidic cartridge is received within the receptacle.

12. The microfluidic cartridge interface device of claim 8, wherein the one or more sensors are configured for optical excitation and/or optical detection of a fluid sample within the microfluidic cartridge to facilitate performance of an assay within the microfluidic cartridge.

13. The microfluidic cartridge interface device of claim 1, wherein the alignment feature comprise a plurality of protruding features configured to be received within a plurality of recesses in the microfluidic device when aligned within the receptacle.

14. The microfluidic cartridge interface device of claim 13, wherein the alignment feature comprise a plurality of pegs configured to be received within a plurality of holes in the microfluidic device when aligned within the receptacle.

15. The microfluidic cartridge interface device of claim 1, wherein the alignment feature is provided on a lower side of the receptacle so as to engage a corresponding alignment feature in an underside of the microfluidic cartridge.

16. The microfluidic cartridge interface device of claim 15, wherein the one or more pressure needles are disposed along an upper side of the receptacle so as to correspond to the one or more pressure septa disposed on a top side of the microfluidic cartridge when aligned within the receptacle.

17. The microfluidic cartridge interface device of claim 1, wherein the enclosure includes a window to allow observation and/or optical interrogation of the microfluidic cartridge from outside the receptacle by one or more sensors while an assay is being performed in the microfluidic cartridge aligned within the receptacle.

18. The microfluidic cartridge interface device of claim 1, further comprising:
a reader configured to read an identifier of the microfluidic cartridge;
wherein the interface is configured to:
associate a sample result obtained by optical detection of the fluid sample within the microfluidic cartridge based on reading of the identifier; and/or
control pressurization of the needles and/or operation of the one or more sensors based on reading of the identifier.

19. A microfluidic cartridge interface device comprising:
an enclosure comprising a top plate coupled with a bottom plate so as to define a receptacle between the top and bottom plate for receiving a microfluidic cartridge having one or more pressure septa in communication with a network of channels to facilitate flow of one or more reagents and/or a fluid sample therethrough upon introduction of pressure through the one or more pressure septa;
an alignment feature disposed within at least a first side of the receptacle, the alignment feature configured to engage a corresponding alignment feature of the microfluidic cartridge to align the microfluidic cartridge within the receptacle;
one or more pressure needles disposed along at least a second side of the receptacle and arranged at pre-determined positions for insertion into the one or more pressure septa of the microfluidic cartridge when aligned within the receptacle; and
one or more sensors configured to identify the microfluidic cartridge or an associated assay and/or to optically interrogate the microfluidic cartridge to facilitate performance of an assay when the microfluidic cartridge is aligned within the receptacle.

20. The microfluidic cartridge interface device of claim 19,
wherein the alignment feature is disposed along the bottom plate so as to engage with the corresponding alignment feature in an underside of the microfluidic cartridge, and
wherein the one or more pressure needles are disposed along the top plate to facilitate insertion into the one or more pressure septa disposed along a top side of the microfluidic cartridge.

* * * * *